(12) United States Patent
Vozyakov et al.

(10) Patent No.: US 12,102,971 B2
(45) Date of Patent: Oct. 1, 2024

(54) GENERATOR OF A VORTEX BRAID BROKEN UP INTO A SYSTEM OF TOROID VORTICES

(71) Applicants: Igor Vozyakov, New Providence (BS); Aleksandr Shcheblanov, New Providence (BS)

(72) Inventors: Igor Vozyakov, New Providence (BS); Aleksandr Shcheblanov, New Providence (BS)

(*) Notice: Subject to any disclaimer, the term of this patent is extended or adjusted under 35 U.S.C. 154(b) by 20 days.

(21) Appl. No.: 17/911,905

(22) PCT Filed: Mar. 15, 2021

(86) PCT No.: PCT/GB2021/050640
§ 371 (c)(1),
(2) Date: Sep. 15, 2022

(87) PCT Pub. No.: WO2021/186155
PCT Pub. Date: Sep. 23, 2021

(65) Prior Publication Data
US 2023/0130758 A1    Apr. 27, 2023

(30) Foreign Application Priority Data

Mar. 16, 2020  (CH) ............................. CH00301/20
Aug. 21, 2020  (GB) .................................... 2013075
(Continued)

(51) Int. Cl.
*C02F 1/52*     (2023.01)
*B01F 25/64*    (2022.01)
(Continued)

(52) U.S. Cl.
CPC ........ *B01F 27/2712* (2022.01); *B01F 25/642* (2022.01); *B01J 19/1806* (2013.01);
(Continued)

(58) Field of Classification Search
CPC ........ G16B 20/00; G16B 20/20; G16B 20/40; G16B 30/00; B01F 2025/9121;
(Continued)

(56) References Cited

U.S. PATENT DOCUMENTS 3,228,660 A  1/1966  Schweiker et al.
4,421,413 A  12/1983 Sekiguchi
(Continued)

FOREIGN PATENT DOCUMENTS

AU    25105/71    2/1970
DE    902708 C    7/1954
(Continued)

OTHER PUBLICATIONS

FR1151883A BIB (Year: 1958).*
(Continued)

*Primary Examiner* — Ellen M McAvoy
*Assistant Examiner* — Chantel Graham
(74) *Attorney, Agent, or Firm* — Tucker Ellis LLP; Michael G. Craig

(57) ABSTRACT

The invention relates to a generator and its operation and use for generating toroidal and spatial vortices in a liquid. It comprises a rotationally symmetrical stator housing with an inlet opening and an eccentric outlet opening. It further comprises a rotor rotatably arranged in the stator housing with radially outwardly extending channels in constant fluid connection to the inlet opening. The rotor comprises a rotor disc, radially outside of the rotor with a side surface with inner notches in fluid connection to the rotor channels. The stator housing comprises a stator disc comprising a side surface with stator notches. When these notches face each other due to rotation of the rotor disc, a periodical liquid flow from the inner notches to the stator notches is formed and toroidal vortices are generated in the portioned liquid by (Continued)

shear stress as the portions of liquid move back and forth in the notches.

20 Claims, 14 Drawing Sheets

(30) Foreign Application Priority Data

| Aug. 21, 2020 | (GB) | 2013078 |
|---|---|---|
| Aug. 21, 2020 | (GB) | 2013079 |
| Oct. 15, 2020 | (GB) | 2016345 |
| Nov. 23, 2020 | (GB) | 2018405 |
| Dec. 14, 2020 | (GB) | 2019678 |

(51) Int. Cl.
*B01F 27/271* (2022.01)
*B01J 19/18* (2006.01)
*C02F 1/26* (2023.01)
*C10G 31/00* (2006.01)
*C10L 1/04* (2006.01)
*B01F 25/00* (2022.01)
*C02F 103/08* (2006.01)

(52) U.S. Cl.
CPC ............. *C02F 1/265* (2013.01); *C02F 1/52* (2013.01); *C10G 31/00* (2013.01); *C10L 1/04* (2013.01); *B01F 2025/9121* (2022.01); *B01F 2025/913* (2022.01); *B01F 2025/916* (2022.01); *C02F 2001/5218* (2013.01); *C02F 2103/08* (2013.01); *C02F 2301/024* (2013.01); *C02F 2301/026* (2013.01); *C10G 2300/1048* (2013.01); *C10L 2200/0438* (2013.01); *C10L 2290/24* (2013.01); *C10L 2290/56* (2013.01)

(58) Field of Classification Search
CPC ............. B01F 25/642; B01F 27/2712; B01F 2025/913; B01F 2025/916; B01F 25/64; B01J 19/1806; B01J 19/2405; B01J 19/185; B01J 19/241; C02F 1/34; C02F 1/52; C02F 2103/08; C02F 2103/32; C02F 2301/024; C02F 1/00; C02F 1/043; C02F 1/265; C02F 1/38; C02F 1/74; C02F 2001/5218; C02F 2101/006; C02F 2103/007; C02F 2103/10; C02F 2103/34; C02F 2301/026; C02F 2301/066; C02F 2303/04; C02F 2305/023; C10G 31/00; C10G 11/00; C10G 2300/1033; C10G 2300/1037; C10G 2300/1048; C10G 2400/02; C10G 2400/04; C10G 31/08; C10G 47/00; C10G 53/00; C10G 9/36; C10L 1/04; C10L 2200/0438; C10L 2290/24; C10L 2290/56; F24F 13/02; F24F 13/0209; F24F 13/0263; F24F 13/20; F24F 7/06; F24F 7/08; A61P 35/00; B02C 19/00; B03B 5/44; B03D 3/00; C01B 2204/28; C01B 2204/32; C01B 32/182; C01B 32/184; C01B 32/19; C01B 32/194; C01B 32/196; C07D 498/18; C07D 519/00; F15D 1/009; Y02A 20/124

See application file for complete search history.

(56) References Cited

U.S. PATENT DOCUMENTS

| 9,956,532 | B2 | 5/2018 | Haden et al. |
| 2011/0139902 | A1 | 6/2011 | Atkinson et al. |

FOREIGN PATENT DOCUMENTS

| DE | 1212943 | B | | 3/1966 |
| DE | 2105823 | A1 | | 8/1971 |
| DE | 1945319 | A1 | | 4/1972 |
| DE | 3444912 | A1 | | 6/1986 |
| FR | 1151883 | A | * | 2/1958 |
| RU | 1813541 | C | | 5/1993 |
| SU | 1256809 | A1 | | 9/1986 |
| WO | 2013056300 | A1 | | 4/2013 |

OTHER PUBLICATIONS

FR1151883A Description Translated (Year: 1958).*
International Search Report from corresponding international PCT application, PCT/GB2021/050640, dated Jun. 21, 2021, 14 pages.
Switzerland Search Report from corresponding international application, CH3012020, dated Mar. 26, 2020, 2 pages.

* cited by examiner

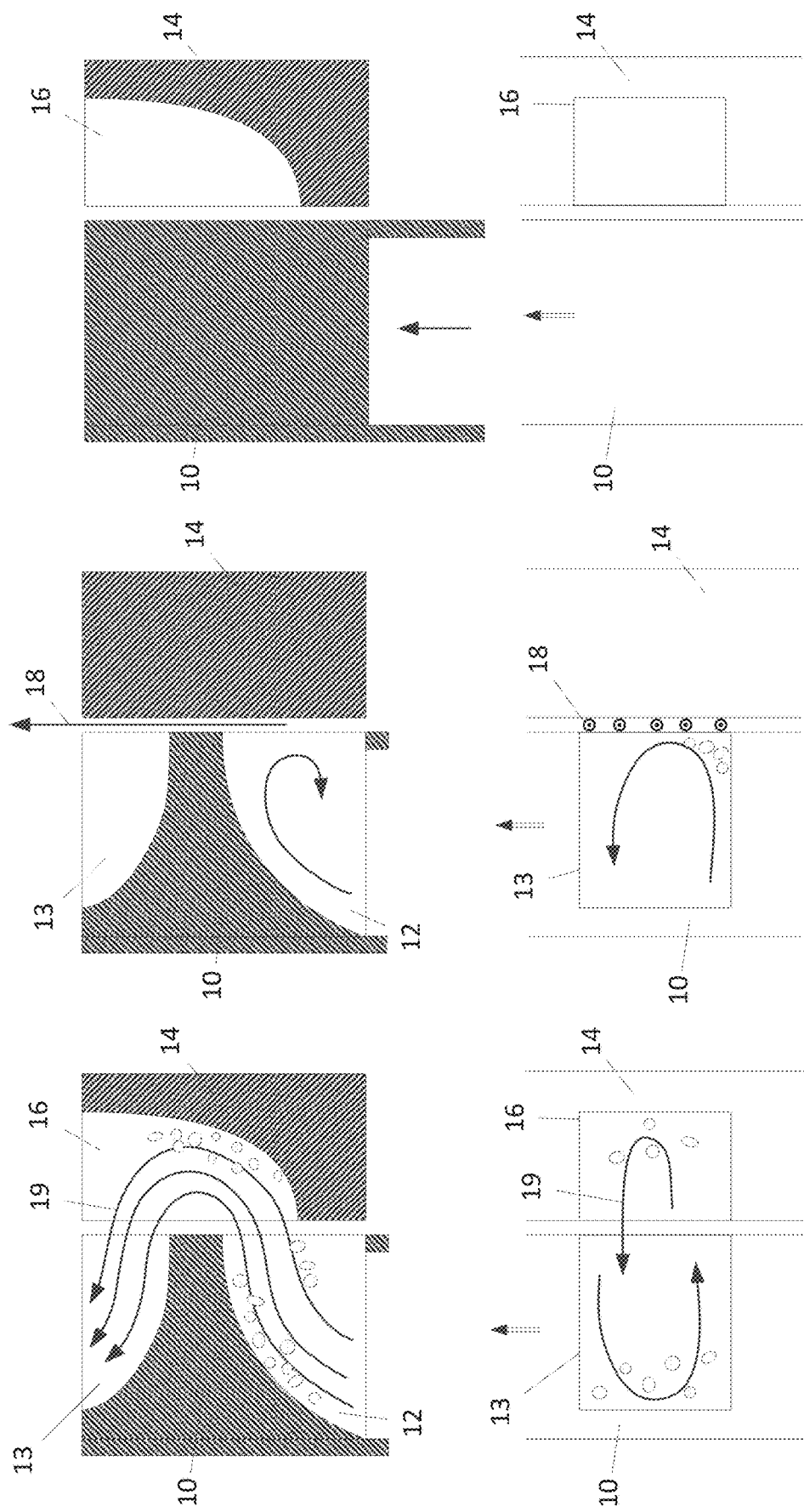

GENERATOR OF A VORTEX BRAID BROKEN UP INTO A SYSTEM OF TOROID VORTICES

CROSS-REFERENCE TO RELATED APPLICATIONS

This application is a national phase application of International Application No. PCT/GB2021/050640, filed Mar. 15, 2021, which claims priority to Switzerland Patent Application Serial No. CH00301/20, filed Mar. 16, 2020, and claims priority to Great Britain Patent Application Serial No. 2013079.5, filed Aug. 21, 2020, and claims priority to Great Britain Patent Application Serial No. 2013075.3, filed Aug. 21, 2020, and claims priority to Great Britain Patent Application Serial No. 2013078.7, filed Aug. 21, 2020, and claims priority to Great Britain Patent Application Serial No. 2016345.7, filed Oct. 15, 2020, and claims priority to Great Britain Patent Application Serial No. 2018405.7, filed Nov. 23, 2020, and claims priority to Great Britain Patent Application Serial No. 2019678.8, filed Dec. 14, 2020, all of which are incorporated herein by reference.

BACKGROUND

The invention relates to a generator for generating toroidal and spatial vortices in a liquid, comprising a substantially rotationally symmetrical stator housing with an axis and an axial inlet opening and an eccentric outlet opening directed in a plane that is oriented normal to the axis, and a rotor rotatably arranged around the axis in the stator housing with radially outwardly extending channels in constant fluid connection to the inlet opening. The invention further relates to a method of operation of such a generator and a use of this method.

Generators for a similar purpose are proposed in the documents U.S. Pat. No. 322,866 A1, US 2011/0139902 A1, U.S. Pat. No. 9,956,532 B2, and WO 2013/056300 A1. An engineering solution by way of vortex generator design, commercialization, and operation over a lengthy time period has also been implemented by the Swedish company Watreco.

All of the examples cited above presuppose a vortex generator designed as a standalone technical device with the medium fed thereto by an additional dedicated external device.

Thus, for instance, the cited devices are not capable of simultaneously processing liquid and gas with a volume ratio of at least 1:1. Further, these devices are not capable of processing a liquid and a solid dispersed in such liquid, such as rock cuttings in crude oil, with a mass ratio of at least 2:1.

SUMMARY

It is an object of the present invention to provide an aforementioned generator to generate a vortex braid broken up into a system of toroid vortices and to change the structure of the liquid medium transferred thereby. Further, it is an object of the present invention to simultaneously processing liquid and gas with a volume ratio of at least 1:1.

The objects are solved by a generator described by the features of the first independent claim.

It is a further object of the present invention to describe a method to be used to treat the said liquid, and a use of such a method. The features in the independent claims of the respective categories describe such methods and use.

According to the invention, the generator comprises by a rotor disc, which is attached to the rotor in a rotationally fixed manner radially outside the rotor, with a side surface normal to the axis. This side surface comprises inner notches spaced apart from one another and equidistant from the axis and in constant fluid connection to the rotor channels, for portion and temporarily blocking the liquid. Further, the generator comprises a stator disc attached to the stator housing with torque proof connection. The stator disc comprises a side surface facing the side surface of the rotor disc. Further, the stator disc comprises stator notches spaced apart from one another and equidistant from the axis, for providing passages for the liquid to form a periodical liquid flow from the inner notches to the stator notches, when these notches face each other due to rotation of the rotor disc in operation. This allows the generation of toroidal vortices in the portioned liquid during use by shear stress as the portions of liquid pass from the inner notches to the stator notches and move back and forth. These notches provide passages for the liquid radially passing the stator disc and the rotor disc to the outlet opening, contributing between 70 and 95% of a total liquid flow through the Generator.

Further, the rotor disc and the stator disc are spaced apart by a gap to allow a permanent liquid flow through that gap from the inner notches to the outlet opening. This generates spatial vortices during use in the laminar liquid flow due to the velocity difference of the side surfaces defining the gap, and due to periodical disruptions by the portioned liquid passing the gap in axial direction. This laminar liquid flow is contributing between 5% and 30% of the total liquid flow through the generator.

In a preferred version, the side surface of the rotor disc further comprises outer notches radially outside of the inner notches spaced apart from one another and equidistant to the axis, for channelling the periodical liquid flow before it may exit the rotor disc.

The inventive method operation of such a generator for generating toroidal and spatial vortices in a liquid comprises the steps of bringing a liquid to the inlet opening and bringing the rotor with the rotor disc attached into rotation. Further, a permanent liquid flow and a periodical liquid flow between the stator disc and the rotor disc are produced.

In the periodical liquid flow of the portioned liquid toroidal vortices are generated by shear stress as the portions of liquid pass from the inner notches to the stator notches and move back and forth.

At the same time, spatial vortices are generated in the permanent liquid flow in the gap between the side surfaces due to the velocity difference of the side surfaces and due to periodical disruptions by the portioned liquid passing the gap in axial direction.

Finally, the permanent liquid flow and the periodical liquid flow are combined to a total liquid flow which is conducted to the outlet opening of the generator to exit the generator.

Circulating with a speed of about 3000 revolutions per minute ±20%, the capacity of the generator is about 200 m³/hour ±20%. With an outer diameter of the rotor and the rotor disc and stator disc about 30 cm ±20%, the rotation speed between the two discs at their side surfaces is about 180 km/hour. The liquid of the constant flow in the gap, which is about 1 mm wide, is accelerated in vortex and thereby transformed to small toroids. The same is true for the liquid entering the inner notches of the rotor disc, when the next stator notch is not jet opposite this inner notch. The liquid is exposed to the same speed of 3000 m/min., while the exit is closed. Naturally, the pressure exceeds, until finally the exit opens, and the liquid can pass to the next chamber, the stator notch. During that passage, it is not only following the rotational way radially outside, but also moves in an axial direction, which further accelerates the liquid and increases the building of vortex and the ability to be transformed to toroids.

This flow might leave the stator-rotor disc system into a spiral of a guide vane which is arranged radially outside of the stator disc and ends in the outlet opening, or it might further pass through outer notches in the rotor disc before entering the guide vane. If such outer notches are built in the side surface of the rotor ring, then the liquid must again change its direction parallel to the axial direction, which further increases the building of vortex and twists the internal flow vis-a-vis the total flow of its vortex portion.

According to an aspect of the present disclosure there is provided a generator (1) for generating toroidal and spatial vortices in a liquid (2), comprising a substantially rotationally symmetrical stator housing (3) with an axis (7) and an axial inlet opening (4) and an eccentric outlet opening (5) directed in a plane (6) that is oriented normal to the axis (7), and a rotor (8) rotatably arranged around the axis (7) in the stator housing (3) with radially outwardly extending channels (9) in constant fluid connection to the inlet opening (4), characterizes by a rotor disc (10), which is attached to the rotor (8) in a rotationally fixed manner radially outside the rotor (8), comprising a side surface (11) of the rotor disc (10) normal to the axis (7) with inner notches (12) spaced apart from one another and equidistant from the axis (7) and in constant fluid connection to the rotor channels (9), for portion and temporarily blocking the liquid (2), as well as a stator disc (14) attached with torque proof connection to the stator housing (3) comprising a side surface (15) of the stator disc (14) facing the side surface (11) of the rotor disc (10), the side surface (15) of the stator disc (14) comprising stator notches (16) spaced apart from one another and equidistant from the axis (7), for providing passages for the liquid (2) to form a periodical liquid flow (19) from the inner notches (12) to the stator notches (16), when these notches (12, 16) face each other due to rotation of the rotor disc (10) in operation, for generating toroidal vortices in the portioned liquid (2) during use by shear stress as the portions of liquid (2) pass from the inner notches (12) to the stator notches (16) and move back and forth, and for providing passages radially outside of the stator disc to the outlet opening (5), contributing between 70 and 95% of a total liquid flow (20) through the generator (1), wherein the rotor disc (10) and the stator disc (14) are spaced apart by a gap (17) to allow a permanent liquid flow (18) through that gap (17) from the inner notches (12) to the outlet opening (5), for generating spatial vortices during use in the laminar liquid (2) flow due to the velocity difference of the side surfaces (11, 15) defining the gap (17) and due to periodical disruptions by the portioned liquid (2) passing the gap (17) in axial direction, contributing between 5% and 30% of the total liquid flow (20) through the generator (1).

The side surface (11) of the rotor disc (10) may comprise outer notches (13) arranged radially outside of the inner notches (12) spaced apart from one another and equidistant from the axis (7), for further increasing the building of toroid vortices within the periodical liquid flow (19) before it may exit the rotor disc (10).

The number of the inner notches (12) may equal the number of the outer notches (13). The number of the inner notches (12) may equal the number of the stator notches (16). The number of notches (12, 13, 16) of each kind may be between 16 and 42.

The generator (1) may further comprise a guide vane (21) inside the stator housing (3) radially outside the stator disc (14) and the rotor disc (10) for guiding the total liquid flow (20) to the outlet opening (5).

The rotor (8) may have an outer diameter of 30 cm, ±20%.

According to an aspect of the present disclosure there is provided a method of operation of a generator (1) as aforementioned for generating toroidal and spatial vortices in a liquid (2), by the steps of
a) bringing the liquid (2) to the inlet opening (4);
b) bringing the rotor (8) with the rotor disc (10) attached into rotation;
c) producing a permanent liquid flow (18) and a periodical liquid flow (19) between the stator disc (14) and the rotor disc (10);
d) generating toroidal vortices in the portioned liquid (2) of the periodical liquid flow (19) by shear stress as the portions of liquid (2) pass from the inner notches (12) to the stator notches (16) and move back and forth;
e) generating spatial vortices in the permanent liquid flow (18) in the gap (17) between the side surfaces (11, 15) due to the velocity difference of the side surfaces (11, 15) and due to periodical disruptions by the portioned liquid (2) passing the gap (17) in axial direction;
f) combining the permanent liquid flow (18) and the periodical liquid flow (19) to a total liquid flow (20);
g) conducting the total liquid flow (20) to the outlet opening (5) of the generator (1) to let it exit the generator (1).

The rotor (8) may rotate with 3000 revolutions per minute, ±20%. The capacity of the generator (1) may be about 200 m³/hour, ±20%.

The liquid (2) brought to the inlet opening (4) may be water with dissolved inorganic salts, such as sea water, and the total liquid flow (20) conducted away from the outlet opening (5) is fresh water with admixed water-soluble crystallised inorganic salts.

The total liquid flow (20) may be filtered after conducted away from the outlet opening (5) for obtaining fresh water separated from the water-soluble crystallised inorganic salts.

According to another aspect there is provided a generator comprising a notched stator; and a notched rotor arranged to rotate in cooperation with the notched stator to block and open cyclically a plurality of passages for a fluid to form a flow with toroidal vortices. The toroidal vortices can provide alternating flow velocities and alternating pressures in a fluid.

A pressure in the generator may be between 8 and 12 atmosphere (between 0.81 MPa and 1.216 MPa). An average pressure in the flow generated by the generator may be between 8 and 12 atmosphere (between 0.81 MPa and 1.216 MPa). A pressure in the fluid outside a toroid vortex may be between 8 and 12 atmosphere (between 0.81 MPa and 1.216 MPa).

The flow may comprise local pressures of at least 10 MPa, preferably at least 25 MPa, further preferably at least 50 MPa. The flow may comprise local pressures of up to 1 mPa, preferably up to 0.1 mPa, further preferably up to 0.01 mPa.

The flow may comprise local velocities of at least 100 meters per second, preferably at least 150 meters per second, further preferably at least 200 meters per second. The flow may comprise local velocities of 200-400 meters per second. The flow may comprise local velocities of 2-4 meters per second. The peripheral flow velocity in a toroidal vortex may be greater than the flow velocity in the fluid outside the toroidal vortex by a factor of at least 10, preferably by a factor of at least 16, further preferably by a factor of at least 20.

The flow may comprise high-frequency alternating flow velocities. The flow may comprise high-frequency alternating pressures. The flow may comprise alternating flow velocities produced at a frequency of at least 500 Hz, preferably 1000 Hz, further preferably 3000 Hz. The flow may comprise alternating pressures produced at a frequency of at least 500 Hz, preferably at least 1000 Hz, further preferably at least 2000 Hz. The flow may comprise high-frequency alternating flow velocities and/or high-frequency alternating pressures produced at a frequency of 600 to 2500 Hz or 640 to 2520 Hz.

The toroidal vortices may have a typical diameter of at least 10 µm, preferably at least 20 µm, further preferably at least 40 µm. The flow may include at least 150, preferably at least 200, further preferably at least 500 toroidal vortices per litre of fluid. The flow may include 200 to 3000 toroidal vortices per litre of fluid or 190-2940 toroidal vortices per litre of fluid.

Due to the formation of such toroids, the liquid is changing its characteristics. For example, demineralization of aquatic salt solutions and concentration of inorganic salts extracted from aquatic salt solutions can be achieved, if sea water is brought to the inlet opening. All nonorganic salts get crystallized in the generator in operation. By filtering the water immediately after it exits the generator, fresh water is separated from most of the salt and minerals. Further examples of the application of the said generator include the low-temperature cracking in the context of processing crude oil feedstocks, mixing, dispersing, emulsifying, suspending, homogenizing, and dissolving.

The invention can be used in petroleum, refining, petrochemical, pharmaceutical, chemical, food processing, and construction industries. Further it can be used in the water treatment in power generation and in the food processing, in the energy sector in the water steam production, in industries for production of fresh potable and non-potable water, for production of monomolecular layers as graphene in dispersing solids whereby the solids are split along flat parallel layers; in the nuclear power sector to treat contaminated effluents while producing concentrated isotopes of radioactive materials and fresh non-potable water, in the wastewater treatment sector to treat industrial and household effluents in order to remove dissolved inorganic salts and to obtain purified water plus dry inorganic salts, as well as in the treatment of sea and ocean water to remove water-soluble minerals and the concentration of such removed water-soluble inorganic salt.

BRIEF DESCRIPTION OF THE DRAWINGS

In the following the invention will be explained in more detail with reference to the drawings.

FIG. 6 sectional and plan view schematic of flows when a stator notch is aligned with a rotor notch
FIG. 7 sectional and plan view schematic of flows when a rotor notch has no overlap with a stator notch;
FIG. 8 sectional and plan view schematic of flows when a stator notch has no overlap with a rotor notch;
FIG. 10 a cross sectional view along the section A-A of FIG. 6a;
FIG. 21b another view of the rotor ring of FIG. 21a.

DETAILED DESCRIPTION

Figure 1:
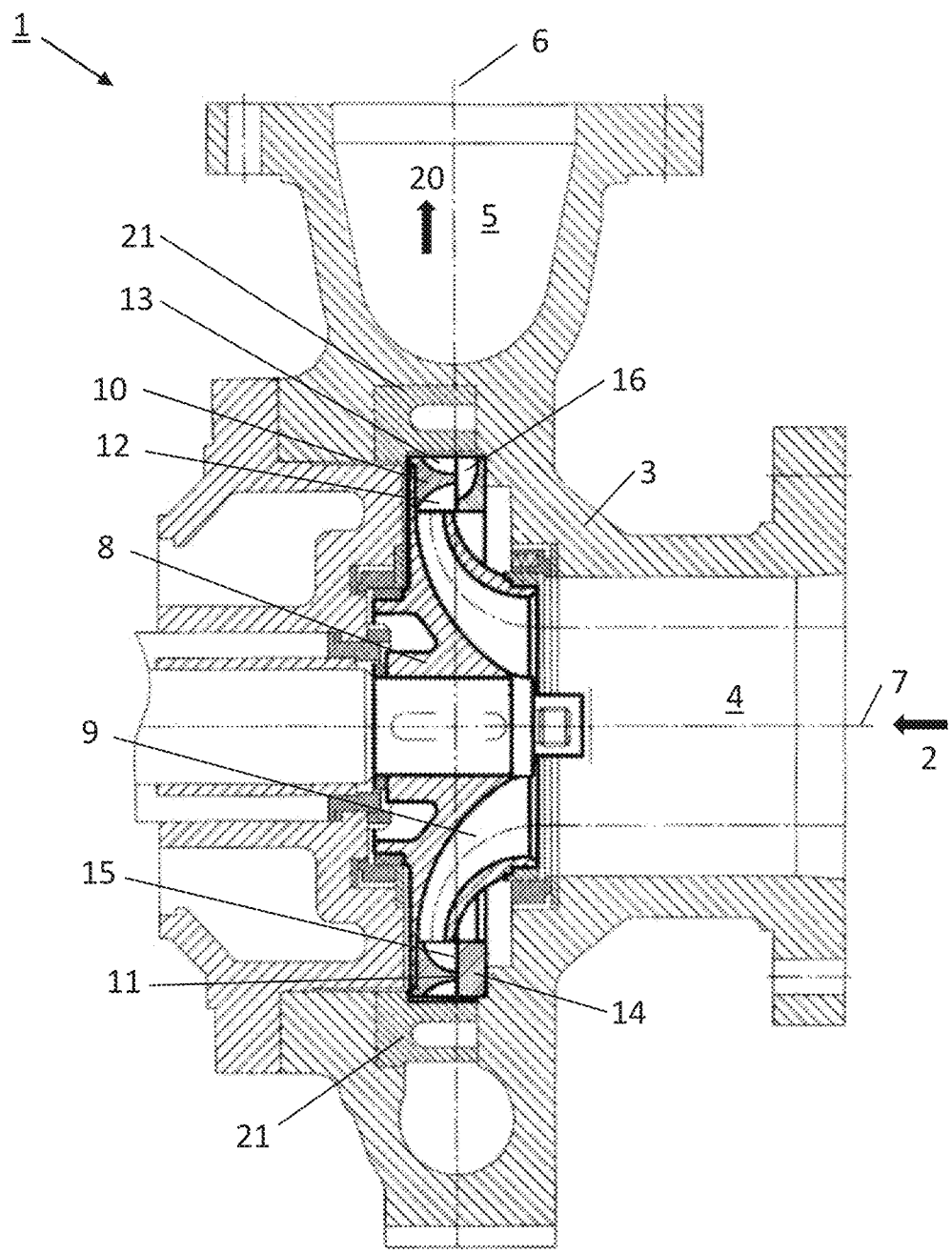
FIG. 1 a cross sectional view of a generator.

FIG. 1 shows a cross sectional view of a generator 1 for generating toroidal and spatial vortices in a liquid 2. As used herein, the term 'spatial vortex' is used to distinguish non-toroid vortices from toroid vortices, and includes vortices where the axis of rotation does not form a closed loop (e.g. tubular vortices, cone-shaped vortices). The generator 1 comprises: a substantially rotationally symmetrical stator housing 3, symmetrical about axis 7; an axial inlet opening 4; an eccentric outlet opening 5 directed in a plane 6 that is oriented normal to the axis 7; and a rotor 8 rotatably arranged around the axis 7 in the stator housing 3, the rotor 8 comprising radially outwardly extending channels 9 in constant fluid connection to the inlet opening 4. In a given example, the rotor 8 has an outer diameter of about 30 cm, ±20%.

Figure 2:
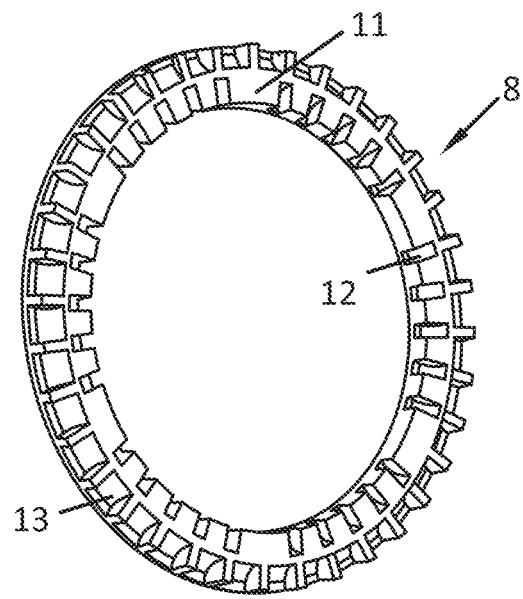
FIG. 2 a perspective view of a rotor disc.
Figure 3:
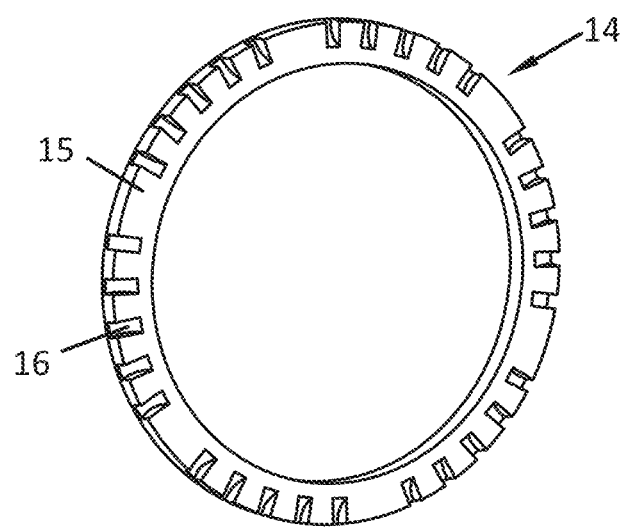
FIG. 3 a perspective view of a stator disc.

The generator further comprises a rotor disc 10 (also referred to as a rotor ring) and a stator disc 14 (also referred to as a stator ring) rotatable about axis 7. FIGS. 2 and 3 illustrate a perspective view of a rotor disc 10 and a stator disc 14 of a generator 1 respectively. Inner notches 12 are arranged periodically about the rotor disc 10, and notches 16 are arranged periodically about the stator disc 14.

The rotor disc 10 as shown in FIG. 2 is attached to the rotor 8 in a rotationally fixed manner radially outside the rotor 8. The rotor disc 10 comprises a side surface 11 normal to the axis 7 with inner notches 12 spaced apart from one another and equidistant from the axis 7, for channelling the liquid 2. The rotor disc 10 may also comprise outer notches 13 on the same surface 11 as the inner notches 12. These outer notches 13 are also spaced apart from one another and equidistant from the axis 7. It should be appreciated that the rotor disc 10 may be provided as a separate part that is distinct from the rotor 8, or it may equally be provided as an integral feature or portion of the rotor 8.

The stator disc 14, shown in FIG. 3, is attached with torque proof connection to the stator housing 3. It comprises a side surface 15 for facing the side surface 11 of the rotor disc 10 and stator notches 16 spaced apart from one another and equidistant from the axis 7. They provide passages for the liquid 2 to form a periodical liquid flow 19 from the inner notches 12 to the stator notches 16. It should be appreciated that the stator disc 14 may be provided as a separate part that is distinct from the stator housing 3, or it may equally be provided as an integral feature or portion of the stator housing 14.

When these notches 12, 16 face each other due to rotation of the rotor disc 10 in operation, a periodical liquid flow 19 from the inner notches 12 to the stator notches 16 is formed, which generate toroidal vortices in the portioned liquid 2 during use by shear stress. This happens as the portions of liquid 2 pass from the inner notches 12 to the stator notches 16 and move back and forth. If the rotor disc 10 comprises the said outer notches 13, the building of toroid vortices within the periodical liquid flow 19 is further increased before it may exit the rotor disc 10.

The number of each kind of notch 12, 13, 16 determines the throughput of liquid and is between 16 and 42, although it will be appreciated that any number of notches can be used. The notches 12, 13, 16 do not need to be arranged equidistant from one another on the respective discs 10, 14, but it is preferred. The number of the inner notches 12 may equals the number of the outer notches 13 and/or the number of the stator notches 16. This is the case in FIGS. 2 and 3.

Figure 4:
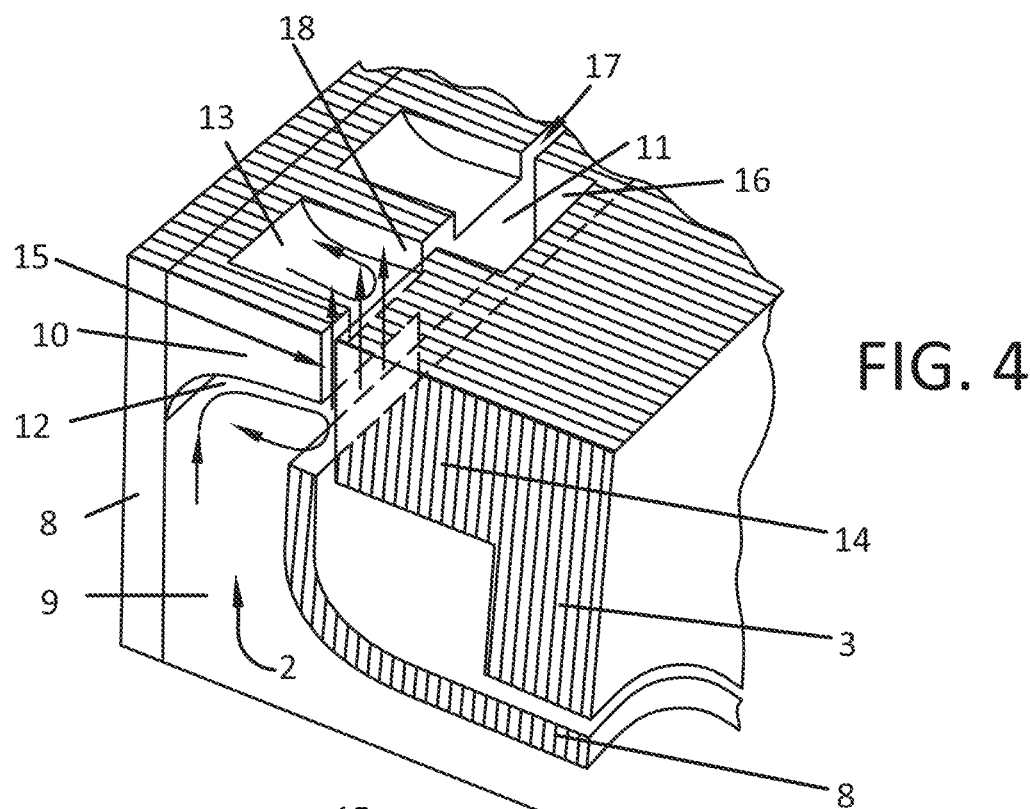
FIG. 4 a perspective drawing of the permanent flow.
Figure 5:
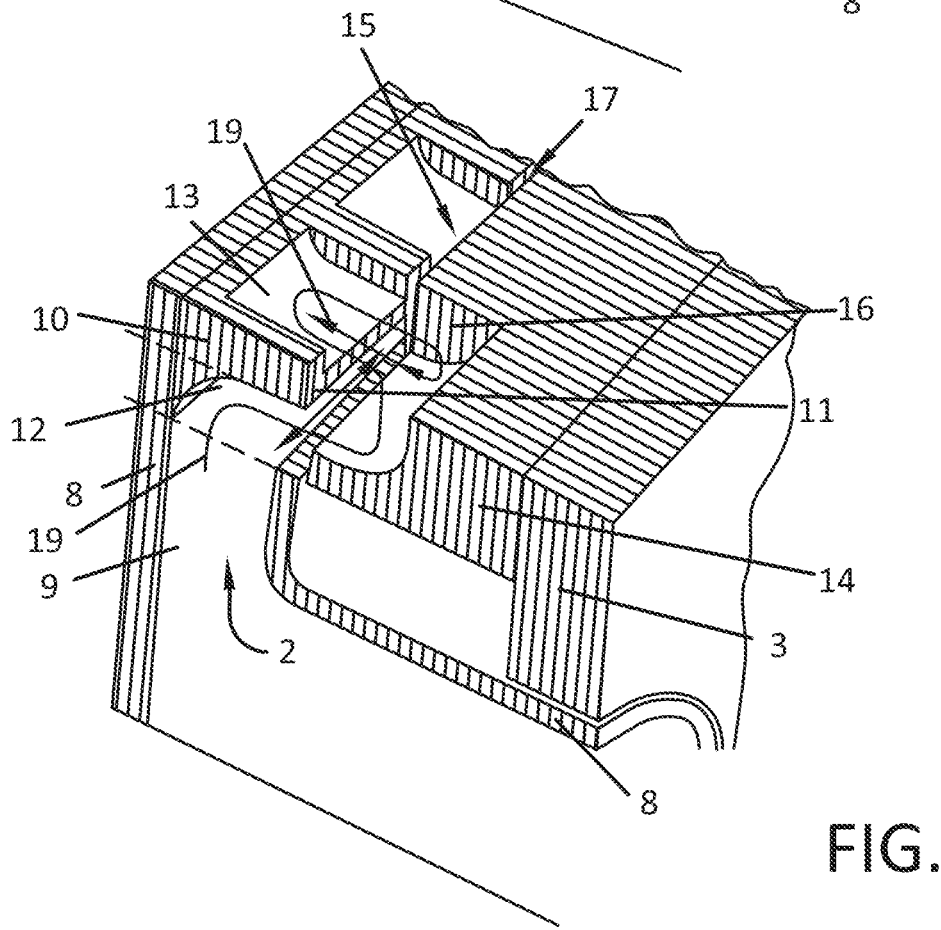
FIG. 5 a perspective drawing of the periodical flow.

FIGS. 4 and 5 illustrate perspective views of a permanent flow 18 and a periodic flow 19 generated by conditions in a generator 1 respectively. In particular, FIGS. 4 and 5 illustrate how the conditions change as the rotor disc 10 and the stator disc 14 move relative to one another. A permanent flow 18 flows in a direction illustrated by arrows in FIG. 4 and flows perpendicular to a periodic flow 19 illustrated by an arrow in FIG. 5. Manipulation of these flows helps to create toroid vortices in the liquid 2.

A permanent liquid flow 18 between the discs 10, 14 flows between the flat parallel side surface 11, 15 of rotor disc 10 and stator disc 14 and moves in a constant radial direction, independent of the positioning of the notches 12, 16. The rotor disc 10 and the stator disc 14 are spaced apart by a gap 17. This gap allows a liquid flow, defined as the permanent liquid flow 18, through that gap 17 from the inner notches 12 to the outlet opening 5. The gap 17 is for generating spatial vortices during use in the laminar liquid 2 flow due to the velocity difference of the side surfaces 11, 15 defining the gap 17, and due to periodical disruptions by the portioned liquid 2 passing the gap 17 in axial direction from the center of the discs outward as illustrated by arrows 18 in FIG. 4. This permanent liquid flow 18 contributes between 5% and 30% of the total liquid flow 20 through the generator 1 depending on the size of the gap 17. In some examples the gap 17 between the rotor disc 10 and stator disc 14 is between 0.8 mm and 1.2 mm wide. In other examples the gap 17 between the rotor disc 10 and stator disc 14 is between 1 mm and 1.8 mm wide. This permanent liquid flow 18 is independent of the actual position of the rotor disc 14.

Inner and outer notches 12, 13 of the rotor disc 10 and stator notches 16 of the stator disc 14 provide volumes in which to form a periodic liquid flow 19 of liquid 2. The periodic liquid flow 19 flows between the inner notches 12 and the stator notches 16 as illustrated, for example, in FIG. 5. When the inner notches 12 and stator notches 16 are aligned, the liquid 2 flows from the inner notches 12 to the stator notches 16, forming the periodic flow 19. Portions of liquid 2 pass back and forth from the inner notches 12 to the stator notches 16 caused by a change in volume as the rotor 8 rotates and the notches 12, 13, 16 successively align and misalign with each other. The periodic flow 19 helps to generate toroid vortices in the portioned liquid 2 by shear stress.

Liquid 2 leaves the rotor 8 to enter the inner notches 12 of rotor disc 10 when it comes opposite the stator notch 16 of stator disc 14; it has roughly the same linear peripheral speed up until the rotor disc 10 rotates aside and comes opposite the enclosed space between the notches 12, 13, 16. At that point, the passage for liquid 2 to exit the chamber of the rotor disc groove would close off. This would produce a pressure spike in the inner notch 12 of rotor disc 10 until an exit for the liquid 2 opens up and the liquid 2 is able to flow into the stator notch 16 formed in the stator disc 14.

FIG. 4 illustrates the case after the closure point of the flow from an inner notch 12 to a stator notch 16. Right after the closure point, the periodical flow 19 becomes further accelerated; a portion of the flow turns 180° and begins to move in the opposite direction to the principal flow within the inner notches 12, taking the shape of a twisted flow and forming a stable vortex braid 22 along the full length of the inner notches 12, which partially enters the stator notch 16.

Further rotation of the rotor disc 10 partially opens the flow passage from the inner notches 12 into the stator notches 16. Given that the opening is still very narrow, the space for the vortex braid flow 22 becomes tight, and the braid begins to break up into toroid vortex pieces. The toroid vortices so generated enter the stator notches 16, where the shape of the notches shapes the vortices into separate toroid vortices.

As the flow passage from the inner notches 12 to the stator notches 16 then gradually widens and opens up, each stator notch 16 is filled with a screw-like vortex braid that, once the total flow of liquid reverses its direction 180°, breaks up into portions, generating similar toroid vortices.

The time period when the stator notches 16 are fully open, and fully aligned with the inner notches 12, is very brief, as the rotor disc 10 rotates at around 3000 revolutions per minute (50 revolutions per second). The number of revolutions per minute (the impeller rotation speed) can be adjusted to achieve variations in pressure experienced by the liquid 2. The rotor's continued rotation tightens the spaces for the vortex braid, as the inner notches 12 gradually close. This promotes continued breakup of the vortex braid into toroid vortices.

As the rotor disc 10 rotates the stator notches 16 are closed off from the inner notches 12 again. Once the stator notches 16 fully close, the entire process repeats, submitting the liquid 2 to high frequency alternating flow velocities and pressures. Rotation of the rotor ring creates a suction effect and draws fluid in.

The generator 1 can be used for generating toroidal and spatial vortices in a liquid 2, by the steps of bringing the liquid 2 to the inlet opening 4, bringing the rotor 8 with the rotor disc 10 attached into rotation, and producing a permanent liquid flow 18 and a periodical liquid flow 19 between the stator disc 14 and the rotor disc 10.

In the portioned liquid 2 of the periodical liquid flow 19, toroidal vortices are generated by shear stress as the portions of liquid 2 pass from the inner notches 12 to the stator notches 16 and move back and forth.

Further, spatial vortices are generated in the permanent liquid flow 18 in the gap 17 between the side surfaces 11, 15 due to the velocity difference of the side surfaces 11, 15 and due to periodical disruptions by the portioned liquid 2 passing the gap 17 in axial direction.

Finally, the permanent liquid flow 18 and the periodical liquid flow 19 are combined to a total liquid flow 20 which is conducted to the outlet opening 5 of the generator 1 to let it exit the generator 1.

In a given example, the rotor 8 rotates with 3000 revolutions per minute, ±20% and the capacity of the generator 1 is about 200 m$^3$/hour, ±20%. As described above, under such conditions, in particular due to the friction of the liquid in the permanent liquid flow 19 and the sudden change of direction in the periodical liquid flow, vortices will be formed and the liquid has the ability to be transformed to toroidal vortices. Considering the changes in flow velocity during various phases and changes in flow direction, all the way to its reversal, a highly turbulent flow is developed within the notches of the rotor and stator rings, which produces a sizable number of vortices.

FIGS. 6, 7 and 8 illustrate the flows between the stator disc 10 and the rotor disc 14 in different configurations in more detail. FIG. 6 shows the flows when a stator notch is aligned with a rotor notch, in sectional and plan views. FIG. 7 shows the flows when a rotor notch has no overlap with a stator notch, in sectional and plan views. FIG. 8 shows the flows when a stator notch has no overlap with an inner rotor notch, in sectional and plan views. In the configuration shown in FIG. 8 it can be seen that in the sections between inner rotor notches fluid is blocked from entering the gap between rotor ring and stator ring. Liquid flow can only exit via an inner rotor notch, as illustrated in FIGS. 6 and 7.

FIG. 6 shows a number of vortices being formed in the periodic flow 19 due to shear along the various notch surfaces of the rotor and stator rings. Liquid flows in a into the inner rotor notch 12, is redirected in the inner rotor notch 12 toward the stator 14, enters the stator notch 16, and is redirected in the stator notch 14. In the illustrated example the flow can enter the outer rotor notch 13 but in other examples the outer rotor notch 13 is omitted and the flow is redirected out of the stator notch 14. In the illustrated examples the notches provide curved surfaces to redirect the flow in the inner rotor notches 12 by approximately 60-90°, and also to redirect the flow in the stator notches 14 by 60-120° or by approximately 60-90° depending on whether or not outer rotor notches 13 are provided. As the flow moves through the notches a number of toroid vortices are formed perpendicular to the liquid flow. The redirections in the notches cause flow shearing and produce vortex zones within the notches.

FIG. 7 shows the permanent liquid flow 18 between the discs 10, 14 that gets squeezed up between the flat parallel side surface 11, 15 of rotor disc 10 and stator disc 14 and moves radially. The permanent liquid flow 18 is affected by shear stresses the rotor disc 10 generates as it moves vis-à-vis the stator disc 14.

The outer notches 12 continuously disrupt the linear nature of the inter-disc flow 18 and generates spatial vortices therein. The permanent liquid flow 18 is further disturbed by vortex flows as the inner notches 12 start to line up with the stator notches 16 and provide a flow path that passes from the inner notches 12 to the stator notches 16 perpendicular to that permanent liquid flow 18.

A conical funnel-shaped spatial vortex forms at a rotor ring notch as the stator ring blocks the periodic flow 19. As the inner notch 12 is closed off, the outside portion of the vortex braid produces a maximum diameter funnel and unfolds towards the rotor ring entrance.

As those spatial vortices come in contact with toroidal vortices, first from the inner notches 12 and then from the stator notches 16, they morph into yet smaller and more intense toroid vortices and, along with toroid vortices from the stator disc notches 12, are dispersed in total flow 20 and carried out into a discharge system. Alternating flow velocities may be produced in the total flow 20 at a frequency of at least 500 Hz, for example. Alternating pressures may also be produced in the total flow 20 at a frequency of at least 500 Hz, for example.

Contact between spatial vortices in the permanent liquid flow 18 and the spatial vortex braid for the periodical flow 19 exiting the stator notches 16 as they fully open also has them morph into more stable toroid vortices and helps to cause the toroid vortices to stabilise. As the two flows 18, 19 commingle, they generate the total liquid flow 20 featuring a meaningful internal volume with a large number of toroid vortices.

The flow area of the permanent liquid flow 18 via the gap 17 is much smaller than the flow area of the periodic liquid flow 19 via the stator notches. Under rotation the flow conditions change very quickly, at high frequency, with large changes in both flow velocity and in flow direction. These effects contribute to the development of a highly turbulent flow which produces a sizable number of toroidal vortices that persist in the flow downstream of the stator disc and rotor disc.

The generator 2 may optionally comprise guide vanes 21 inside the stator housing 3 radially outside the stator disc 14 and rotor disc 10 for guiding a total liquid flow 20 to the eccentric outlet opening 5. Passages 23 radially outside of the stator disc 14 to the outlet opening 5 are provided by the spiral guide vanes 21, with blades bent in the opposite direction to the impeller blades. At the nearest point to the rotor and stator discs the guide vanes leave only a very small gap.

Figure 9:
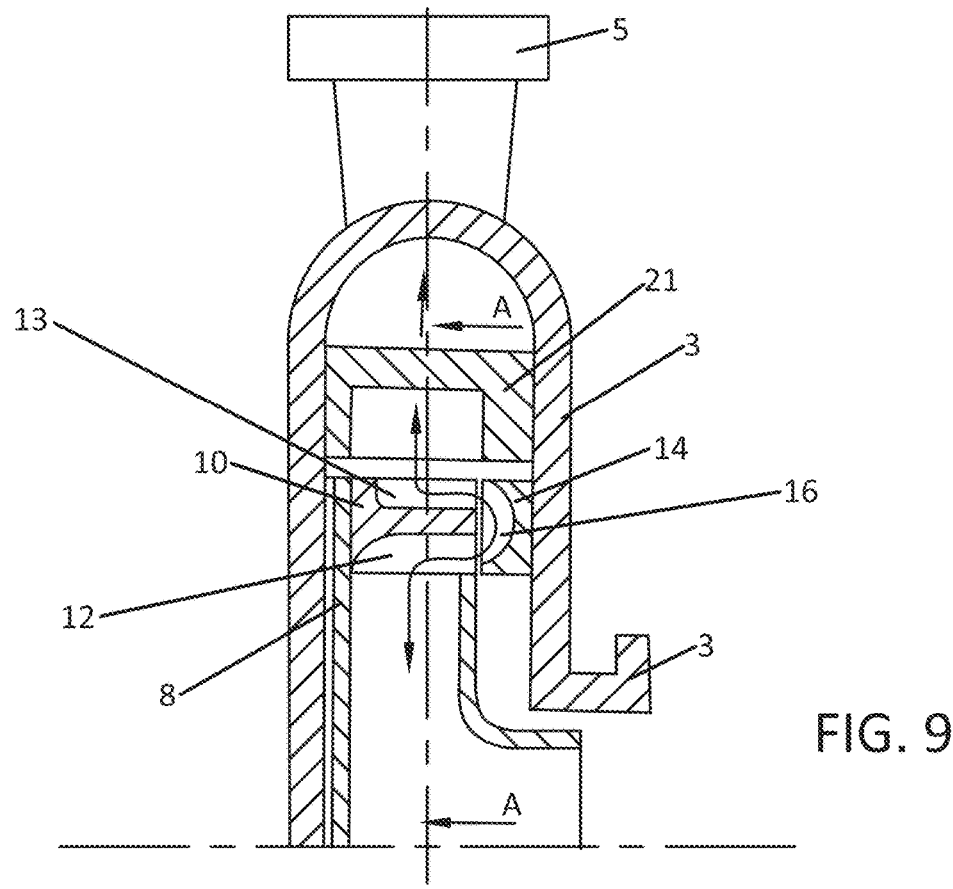
FIG. 9 a cross sectional view of a portion of the generator of FIG. 1.
Figure 10:
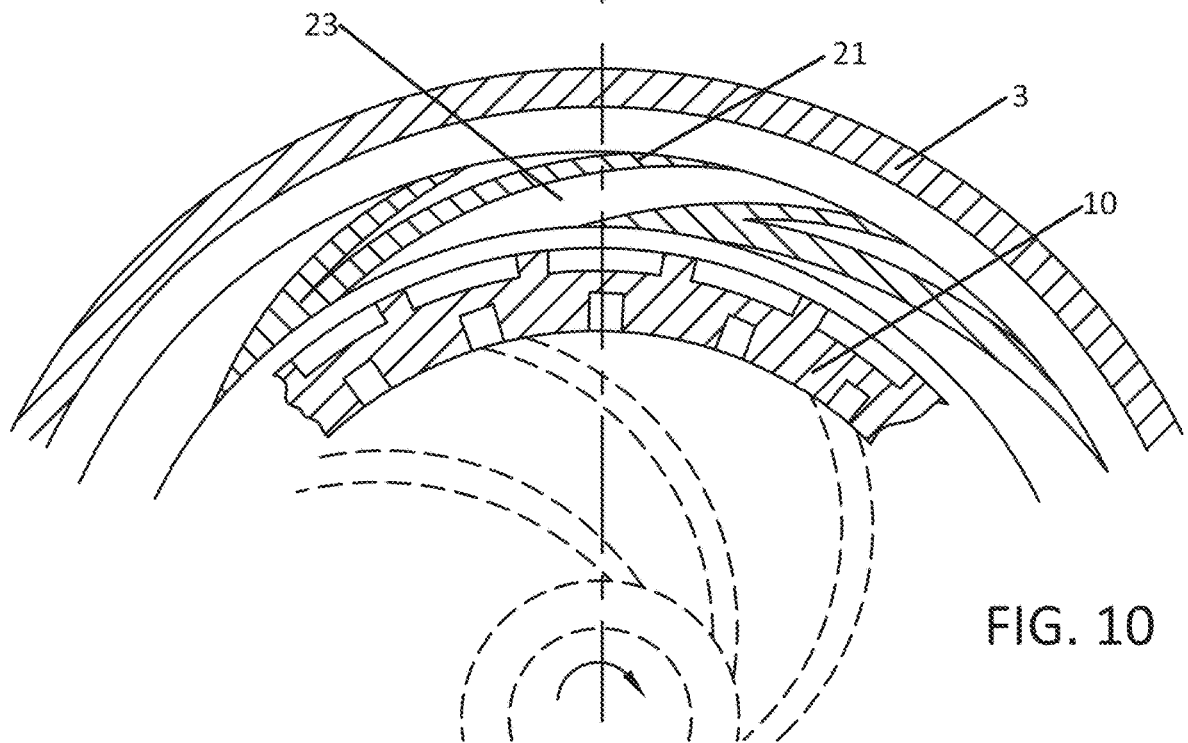
Figure 11:
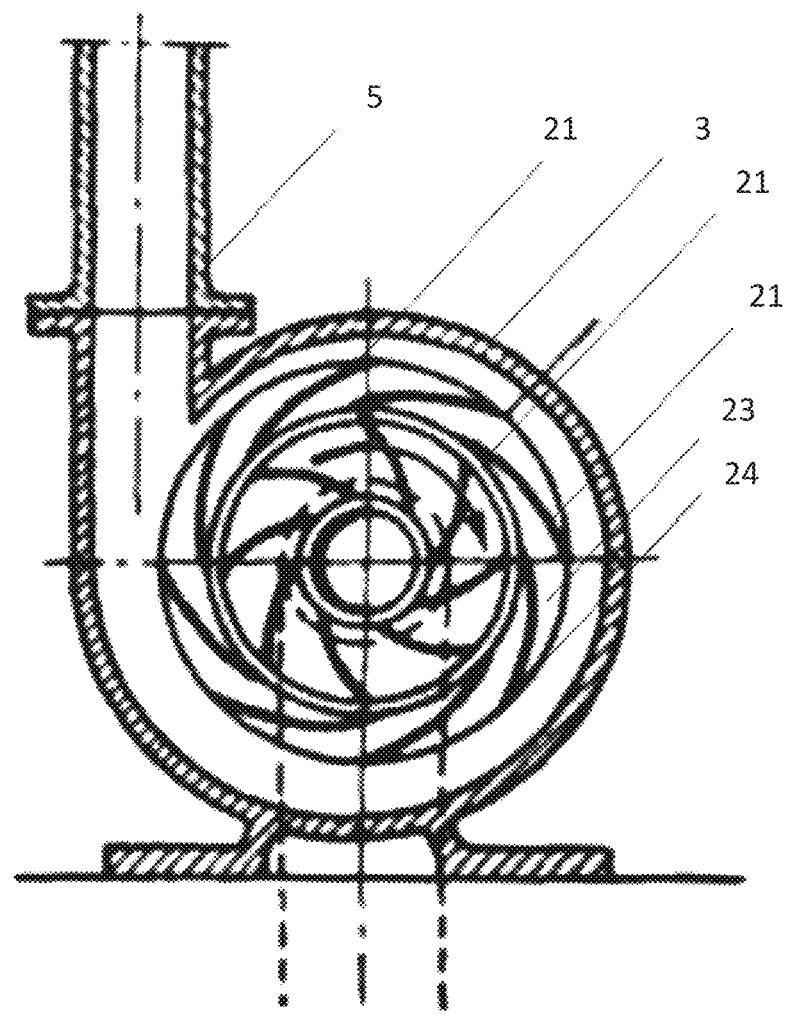
FIG. 11 a cross sectional view of a generator with outlet duct.

FIGS. 9 and 10 show the vanes 21 arranged in the stator housing 3 providing passages 23 for the flow downstream of the stator disc 14 and rotor disc 10. FIG. 11 shows the guide vanes 21 feeding into the pump's spiral discharge duct 24 leading to the outlet opening 5, as is well known in the art. The liquid exiting the stator disc 14 and rotor disc 10 passes through the passages 23 between the evenly spaced guide vanes 21 to enter the pump's spiral discharge duct 24 and exits the generator via the outlet opening 5.

The guide vanes 21 are intended to reduce the velocity of liquid exiting the stator disc 14 and rotor disc 10. In this context, the stream's kinetic energy is partially converted into pressure energy, with the pressure at the guide vane exit greater than the pressure at the entry thereto. The vanes can be optimized to meet specific desired operating parameters for a pump. The vanes can promote vortices staying intact downstream of the rotor/stator discs, for up to 3 to 5 meters within the discharge pipeline.

In an example, the liquid 2 brought to the inlet opening 4 can be water with dissolved inorganic salts, such as sea water, and the total liquid flow 20 conducted away from the outlet opening 5 is fresh water with admixed water-soluble crystallised inorganic salts. The total liquid flow 20 must be filtered after conducted away from the outlet opening 5 for obtaining fresh water separated from the water-soluble crystallised inorganic salts.

In another example, the liquid 2 brought to the inlet opening 4 may be fuel oil with 3-5% sulphur an up to 3% water, and the total liquid flow 20 conducted away from the outlet opening 5 is fuel oil with 0.3-0.5% sulphur, up to 5% colloidal sulphur and up to 1% liquid hydrocarbon. The total liquid flow 20 is filtered after conducted away from the outlet opening 5 for obtaining fuel oil separated from colloidal sulphur.

Compared to other processes leading to the same results, the method described here is much easier, cheaper and reliable.

The method can be used in one of the following industries, to name a few: In petroleum, refining, petrochemical, pharmaceutical, chemical, food processing, and construction industries; in the water treatment in power generation and in the food processing; in the energy sector in the water steam production; in industries for production of fresh potable and non-potable water; for production of monomolecular layers as graphene in dispersing solids whereby the solids are split along flat parallel layers; in the nuclear power sector to treat contaminated effluents while producing concentrated isotopes of radioactive materials and fresh non-potable water; in the wastewater treatment sector to treat industrial and household effluents in order to remove dissolved inorganic salts and to obtain purified water plus dry inorganic salts; in the treatment of sea and ocean water to remove water-soluble minerals, and the concentration of such removed water-soluble inorganic salt.

Further example:

The details of an exemplary generator are now described in more depth.

Pump capacity, Q=200 m$^3$/hour

Pressure head, H=12 atmospheres (1216 kPa)

Impeller speed, n=3,000 revolutions per minute

Outer diameter of the impeller, D=0.32 m

Impeller width, h=0.025 m

Number of impeller blades, a=6

Guide vane channel 0.040 m by 0.035 m

Rotor ring parameters:

Number of rotor inner notches, $N_p$=18

Rotor inner notch width, $h_p$=0.025 m

Rotor inner notch height, $L_p$=0.015 m

Rotor inner notch depth, $a_p$=0.025 m

Stator ring parameters:

Number of stator notches, $n_c$=18

Stator notch width, $h_c$=0.025 m

Stator notch height, $L_c$=0.020 m

Stator notch depth, $a_c$=0.020 m

Gap between the frontal surfaces of the rotor and stator rings, B=0.001 m

Figure 12:
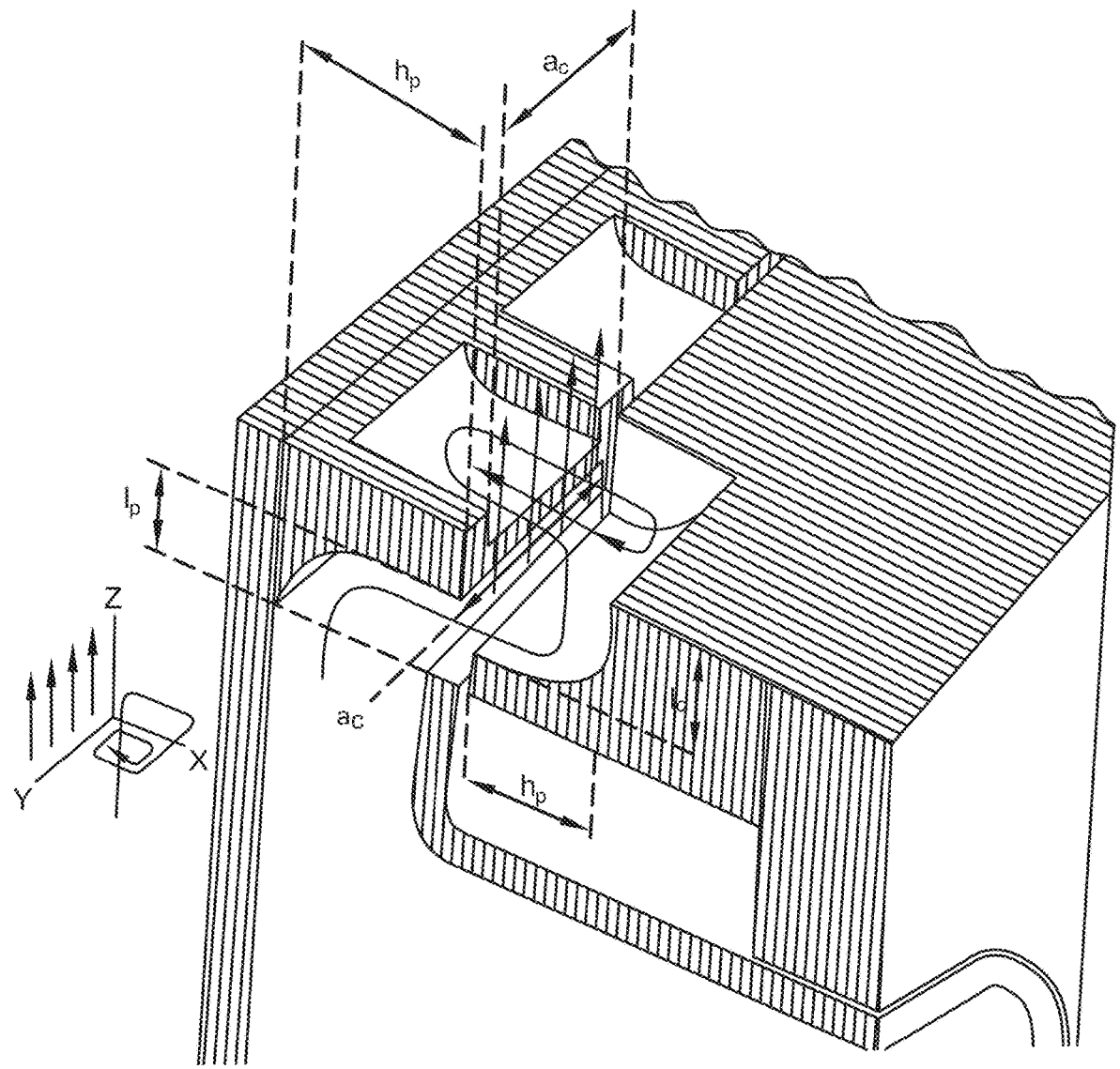
FIG. 12 a perspective drawing indicating different notch dimensions.

The notch dimensions quantified above are indicated in FIG. 12.

The above parameters are in line with the details of an actual petroleum pump used at refining facilities. An actual petroleum pump can be modified to provide a generator by installing a rotor disc and stator disc. The dimensions and configurations of the rotor disc and stator disc are consistent with the objective of forming a flow with toroid vortices. In case a rotor disc and stator disc are installed in a conventional pump, the outer diameter of the rotor and stator discs can be made to match the outer diameter of the pump's impeller such that the modified impeller with the rotor disc can be installed in the pump housing.

While in operation, rotor 8 and rotor disc 10 fixedly attached thereto rotate at some 3000 revolutions per minute +/−20%; the rotor disc's outer diameter ranges from 0.25 to 0.40 meter +/−20%. Its linear peripheral speed averages 47-125.7 meters per second or 170-450 kilometers per hour. In case of such device with a rotor disc 10 of 0.3-meter outer diameter, its linear peripheral speed would amount to 94 meters per second or 340 kilometers per hour.

Figure 13A:
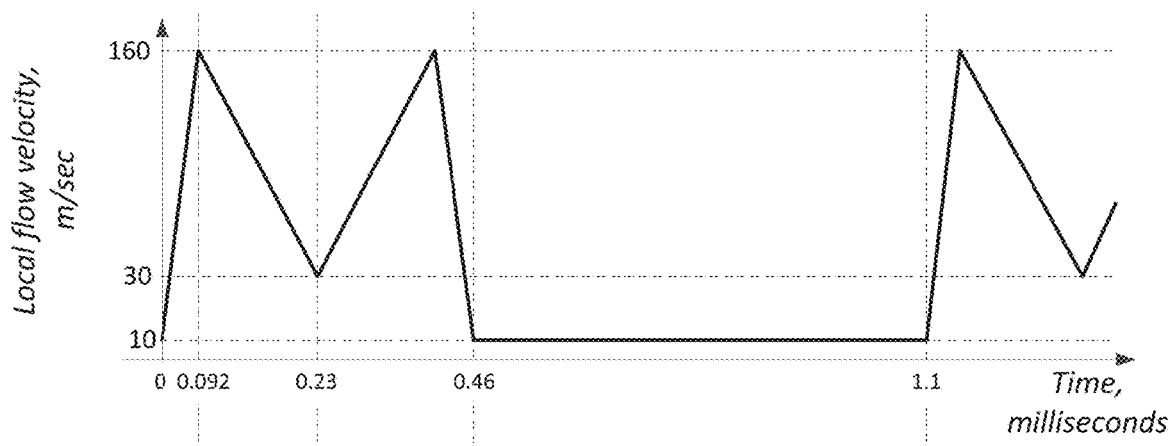
FIGS. 13a, 13b and 13c graphs of local flow velocity, acceleration and absolute pressure in flow in a generator during different phases of operation.
Figure 13B:
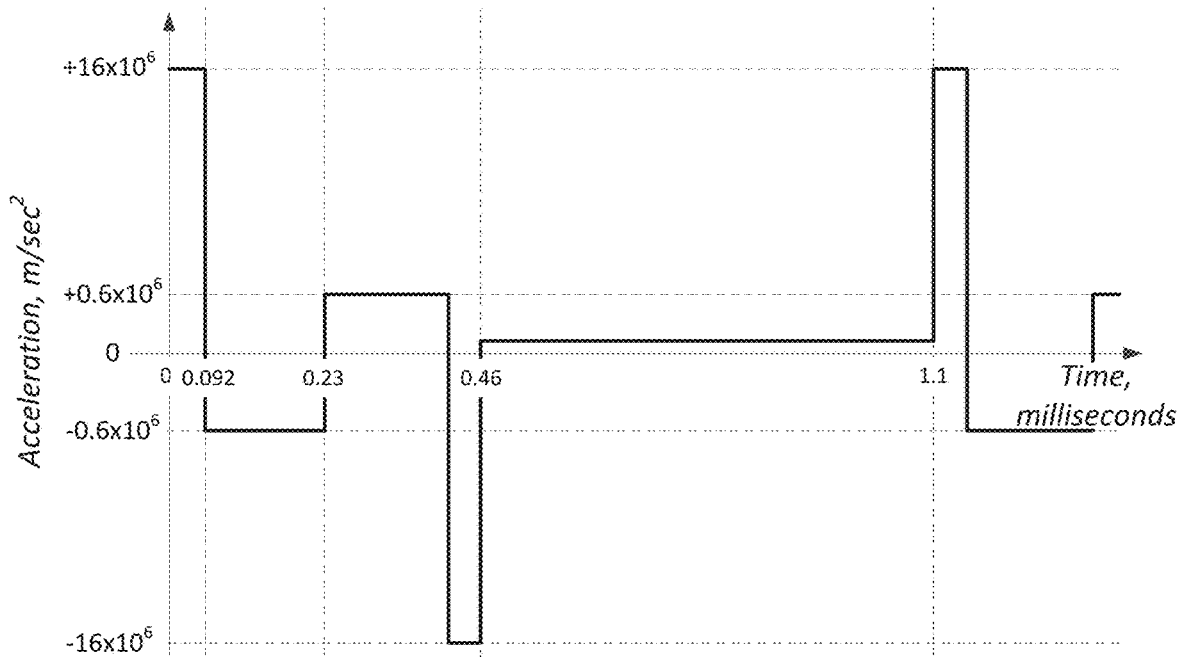
Figure 13C:
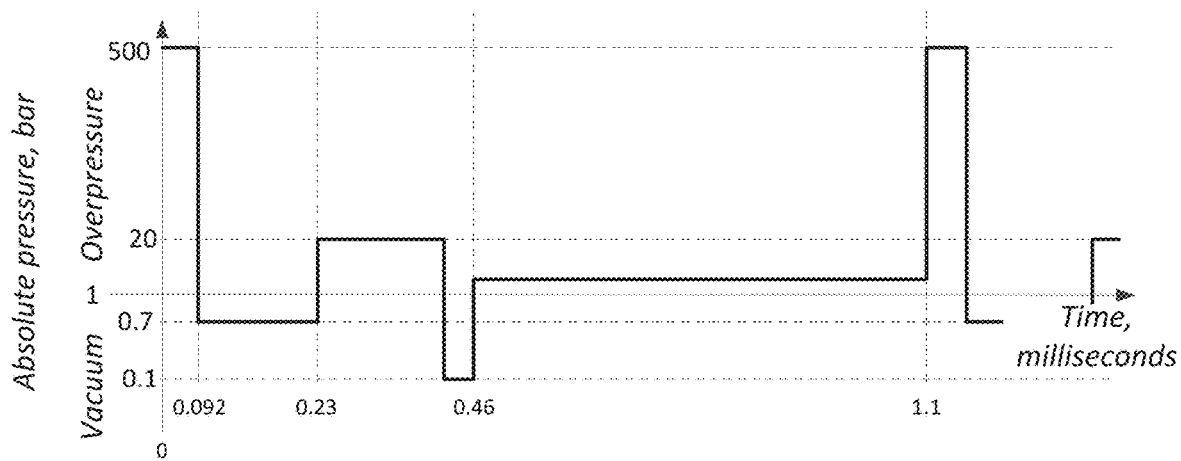

FIGS. 13a, 13b and 13c show graphs of local flow velocity, acceleration and absolute pressure in flow in an exemplary generator during different phases of operation. The graphs show flow conditions immediately downstream from the rotor ring/stator ring passage, from t=0 just before a rotor ring inner notch 12 starts to line up with a stator notch 16, continuing until the rotor ring notch fully opens (i.e. is in alignment with a stator notch) and further until the rotor ring notch closes.

As the notch 12 starts to open up, over a duration of 0.000092 seconds (0.092 milliseconds), flow velocity increase from 10 to 160-200 meters per second (m/sec). As the rotor ring notch then comes into full alignment, over a duration of 0.00023 seconds, flow velocity drops to 30 m/sec. Subsequent movements of the rotor ring result in continued progressive closure of the notch, boosting the flow velocity to 160-200 m/sec. With further rotation of the rotor ring, the notch closes (i.e. it no longer is located at a stator notch), and the flow velocity (from flow through the gap 17) drops to 10 m/sec. As the rotor ring continues to rotate, the notch 12 is in its closed configuration (with only flow through the gap 17) for 0.00064 second. The notch 12 remains in its open configuration (fully or partially lined up with a stator notch) for 0.00046 second.

Such rapid changes in flow velocity occasioned by rotor ring rotation within the same time period produce significant alternating accelerations of the flow that change from +16,000,000 to −16,000,000 m/sec$^2$. Such accelerations affect the liquid within the rotor ring notch and the slot-like gap between the rotor and stator rings.

The forces that develop in the process produce pressure in a portion of liquid flow, which varies from 500 bar (50 Megapascal MPa or 510 atmosphere atm) overpressure to 0.1 bar (0.01 MPa) vacuum over a period of 0.00046 seconds. In a 0.000092 second timespan the pressure drops from 500 bar (50 MPa) overpressure to 0.7 bar (0.07 MPa) vacuum. Such rapid pressure changes, from overpressure to vacuum and back, can be very effective at flaking particles that may be in the flow along stress lines and structural defects.

In some examples, depending on the generator design, the maximum local pressure in a toroid vortex may reach 200-400 kg/cm$^2$ (around 20-40 MPa) and flow velocity change per unit of time (acceleration) is 50,000 G (around 490,000 m/sec$^2$).

Peripheral liquid flow velocity in a toroid vortex is greater than that of the fluid outside the toroid vortex. For example, peripheral flow velocity in a toroid vertex may be between 5 and 10 times that of the flow velocity outside the toroid vertex. Peripheral flow velocities of liquid flow in a toroid vortex may be at least 100 m/s, for example, 200 m/s to 400 m/s. Pressure of a toroid vortex may also be greater than the pressure in the fluid outside the toroid vortex. Local pressures of at least 500 kPa may be achieved.

At 3000 revolutions of the rotor ring per minute, and from 12 to 48 notches on the rotor ring, the vortex braid generation process is near enough continuous to be effectively continuous. The spatial vortexes formed in the chamber comprised by rotor ring notches and stator ring notches may be deemed stable, and their number deemed consistent with the number of notches, i.e., 12 to 48; in their turn, the spatial vortexes produce a large number of smaller toroid vortexes with a typical torus diameter of 20-40 micrometers. The vortex braid breaks down into toroid vortexes typically ranging from 20 to 40 micrometers in diameter. Larger and smaller toroid vortexes are present as well, but in lower numbers. As the toroid vortexes travel in the flow they gradually dissipate and shrink. In an example at a distance of 3 meters from the outlet port of the generator 20-40 micrometer vortexes are still found in the pipeline. At that point smaller vortexes may have dissipated and may not be observed, whereas larger vortexes may have split into smaller ones and coincide in the 20-40 micrometer size.

In an example the rotor ring rotates at 40-60 Hz and has 16-42 notches to generate toroid vortices at 640 to 2520 Hz. In this example 256-1764 vortices are produced per revolution. In addition to such primary vortexes formed at a primary frequency, secondary vortexes are formed with an integral multiple frequency (integer N=2, 4, 6, 8), but the efficiency of those secondary vortexes is significantly less compared to efficiency of the primary vortexes. In an example where the generator throughput is about 160-240 $m^3$/hour, a density of around 190-3000 primary vortices may be generated per litre of fluid.

As described above, under such conditions, in particular due to the liquid in the permanent liquid flow 18 and the sudden change of direction in the periodical liquid flow 19 (in a direction perpendicular to the permanent liquid flow 18), a vortex is built and the liquid 2 forms toroid currents therein. The liquid 2 is subjected to resulting high frequency alternating pressures and flow velocities.

Figure 14:
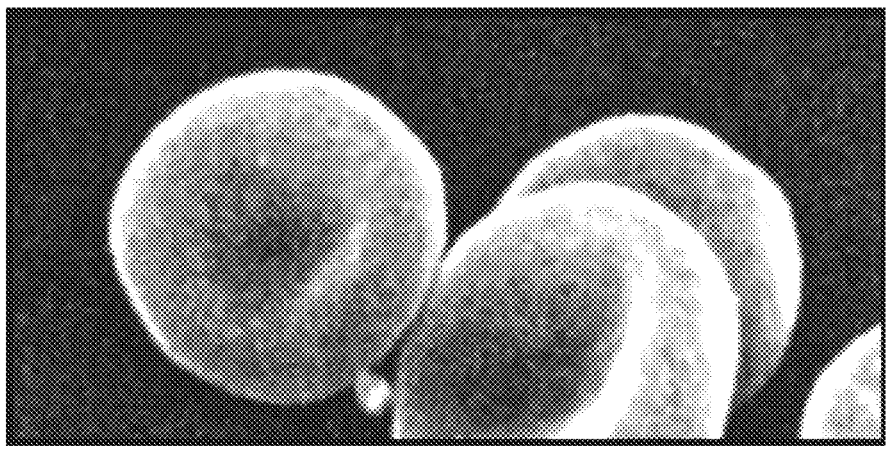
FIG. 14 a photo of an evolving toroid.
Figure 15:
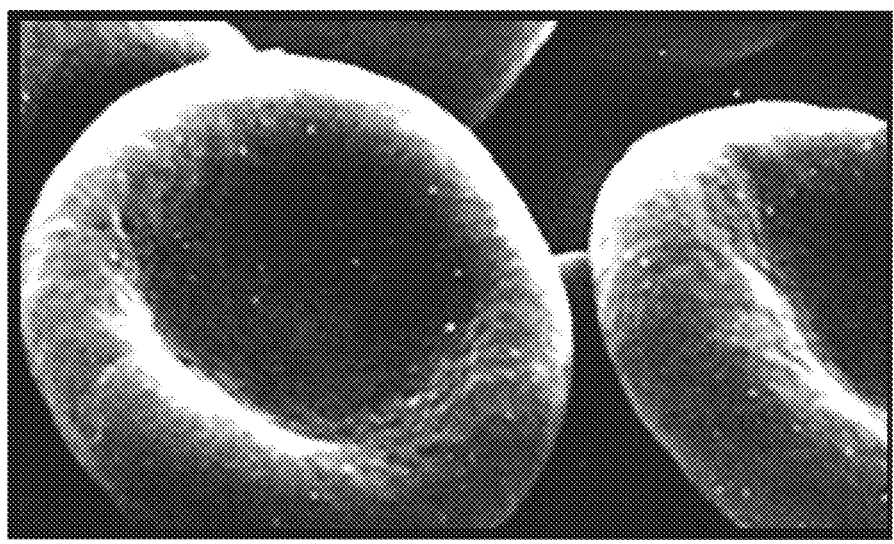
FIG. 15 a photo of a fully formed toroid.

FIG. 14 shows a photo of an evolving toroid and FIG. 15 a photo of a fully formed toroid. The photo was made using a confocal laser scanning microscope. Its approximate transverse resolution is 0.2-0.5 μm. The frame size is 2'000 dots per frame, 400 μm-1 cm. The approximate resolution along the Z axis is 0.3 μm. The photos show toroidal features with a diameter of around 20-40 micrometers. It is calculated that around its outer diameter, such a liquid toroid vortex registers peripheral speeds of 200-400 meters per second while staying in the stream of that same liquid that moves at 2-4 meters per second.

The images shown in FIGS. 14 and 15 were obtained by examining a fluid following processing in a generator as described above. Immediately after processing in the generator the fluid was subjected to flash freezing in liquid nitrogen in order to preserve the flow features.

In more detail, vacuum distillation tower residue from an oil refinery (with a softening point of +32° C. and a flash point of +328° C.) was provided at atmospheric pressure and fed to a generator as described above. The vacuum distillation tower residue was provided to a bitumen production column using the generator at a process temperature of +200° C. and at atmospheric pressure, and the ambient temperature was −15° C. Bitumen so obtained and featuring a softening point of +48° C., and a flash point of +326° C. was chosen for examination due to its high viscosity so as to preserve the altered internal structure throughout the freeze period.

Following processing of the bitumen in the generator the product was flowed via a pipeline with 12 mm internal diameter into air cooler, then into a water cooler, and then into a liquid nitrogen tank of 50-liter capacity for immediate freezing. After a portion of frozen bitumen was obtained in the tank, the portion was held in the tank for 1 hour under liquid nitrogen, whereupon a frozen sample of finished product was extracted from the tank.

The sample constituted a glassy black mass in the form of a cylinder. It was chipped, in the frozen state, to form flat surfaces for examination using the method described above. Visually, the sample presented a smooth black glossy surface; examination under confocal laser scanning microscope revealed the internal structure seen in FIGS. 14 and 15.

Reference samples of the same material prepared in the same way but without processing in the generator failed to exhibit the internal structure seen in FIGS. 14 and 15.

Another sample of the same material was prepared in the same way with processing in the generator, but collected in an tank without liquid nitrogen and permitted to cool for 8 hours only under the influence of the ambient temperature (without air cooler or water cooler prior to collection in the tank). This sample revealed no difference compared to the reference sample, and also failed to exhibit the features seen in FIGS. 14 and 15.

The sample obtained using the generator and frozen as described above was evaluated further after examination and producing the images seen in FIGS. 14 and 15. The product was reheated to 90° C., held under such temperature until liquid, was re-frozen again in liquid nitrogen and examined for its internal structure. In this case, its internal structure revealed no difference compared to the reference sample.

The generator 1 is capable of processing a liquid 2 and a solid dispersed in such liquid (e.g., rock cuttings in crude oil) with a mass ratio of at least 2:1. The generator 1 is also capable of processing liquids with kinematic viscosity in excess of 400 $mm^2$/sec.

Figure 16:
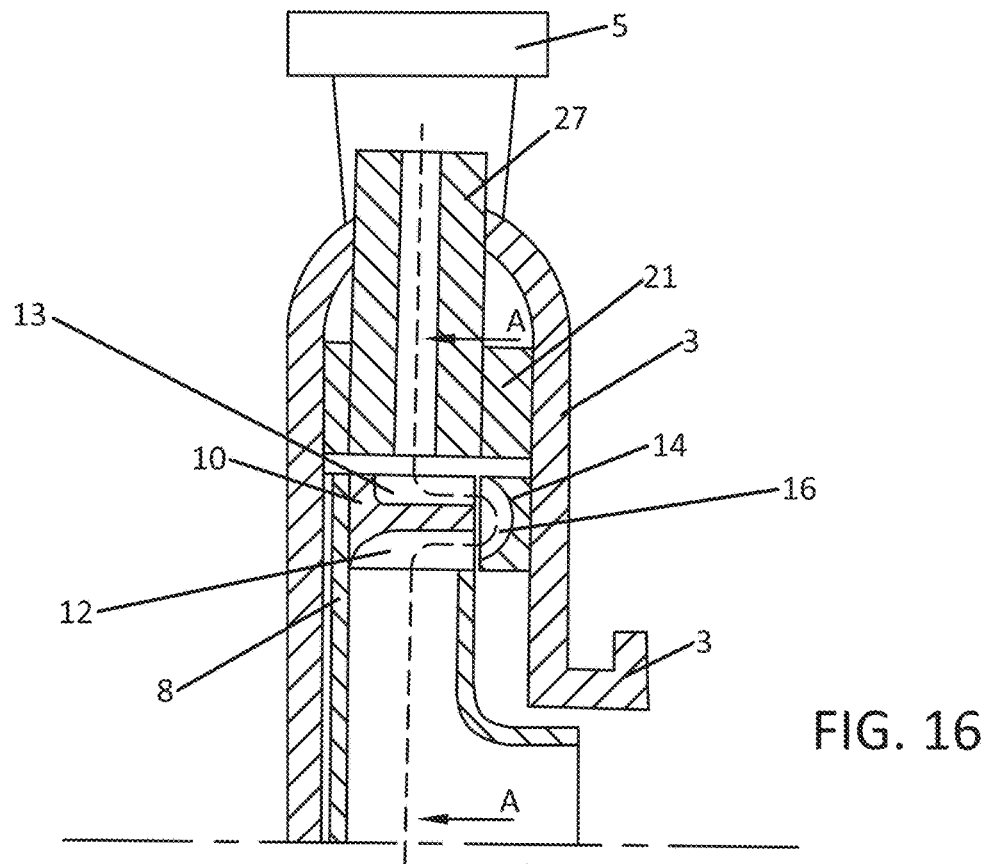
FIG. 16 a cross sectional side view of a generator with a nozzle.
Figure 17:
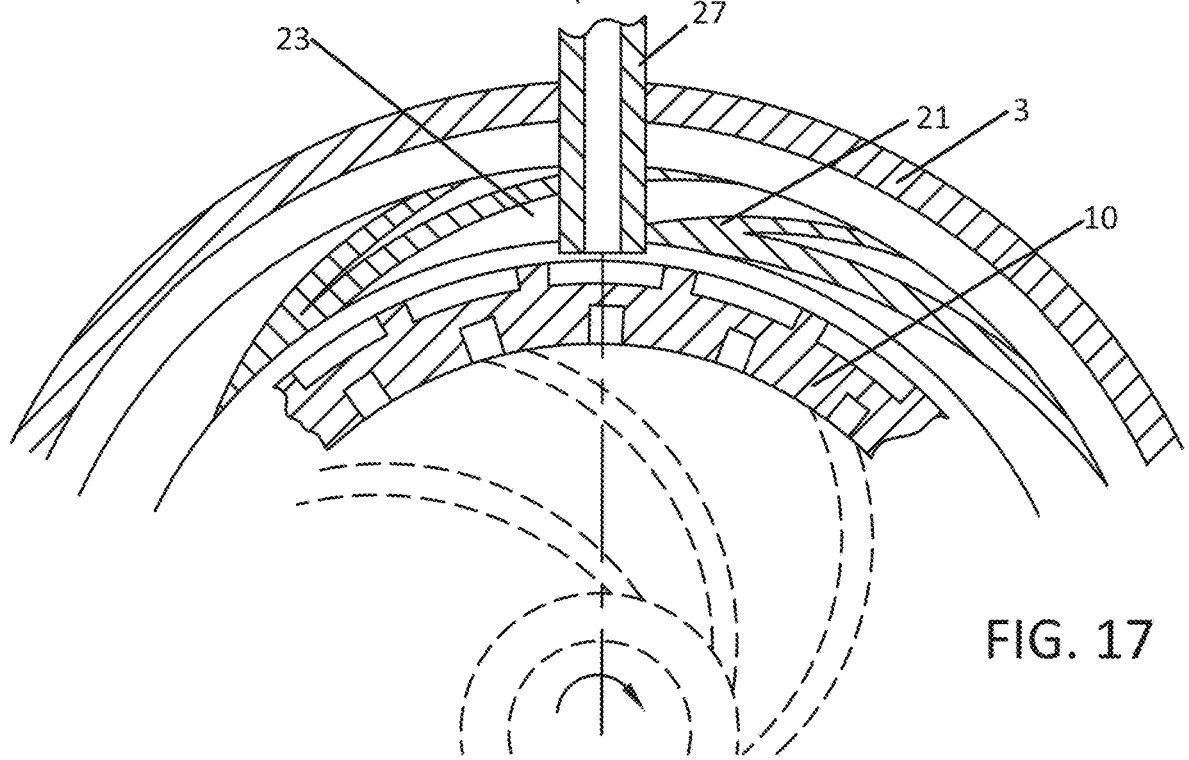
FIG. 17 a cross sectional front view of the generator with a nozzle of FIG. 17.

In a variant a nozzle is included in a generator in order to introduce a second fluid into the primary flow. For example air or water vapour or other gases, or a fluid that is heterogenous in respect to the primary flow, or a dispersion of a solid in a liquid, or a flowable solid such a powder can by introduced into the primary flow by way of the nozzle. FIGS. 16 and 17 show an example of a nozzle 27 in a generator otherwise as described with reference to FIGS. 1-15.

As described above, liquid enters the generator 1 at the inlet of the generator. Gas, e.g. air, can be introduced to the liquid via a special nozzle 27 that can be provided for this purpose in the generator. The nozzle serves to deliver gas (or other fluids) to the generator such that the gas contacts liquid as the latter leaves the stator and rotor ring structures. The end of the nozzle 27 that delivers gas to the flow is situated in proximity to the rotor ring 10 and stator ring 14 assembly such that gas leaving the nozzle 27 contacts liquid as it leaves the rotor ring 10 and stator ring 114 assembly. Nozzles of various design and configuration may be used. Movement of the rotor ring's upper portion creates suction within the generator, which draws fluid through the nozzle 27 and into the fluid flow.

In the illustrated example the nozzle 27 passes through a guide vane 21; the nozzle 27 functions independent of the guide vane 21 and the nozzle can be provided in the absence of a guide vane.

In the illustrated examples one nozzle is provided on the circumference of the rotor/stator ring assembly. In other examples two or more nozzles are distributed around the circumference of the rotor/stator ring assembly.

The diameter of the nozzle outlet is less than the width of an outer notch of the rotor ring. The centre of the nozzle outlet is aligned with the centre of the outer notches of the rotor ring.

The nozzle outlet is located 2-3 mm from the outer surface of the rotor ring to enable this suction effect to act on the water vapour in the nozzle. Movement of the rotor ring's upper portion creates a vacuum zone of 0.2-0.6 atm, which ensures continuous suction of gas into the flow.

Figure 18:
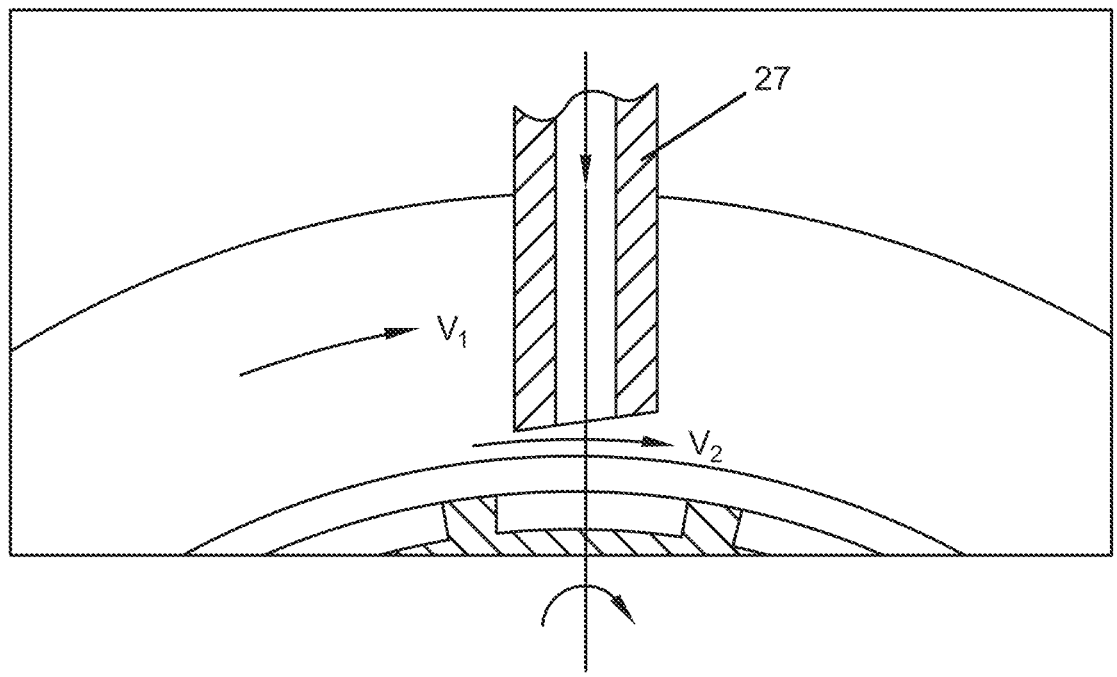
FIG. 18 a cross sectional side view of a generator with a nozzle.
Figure 19:
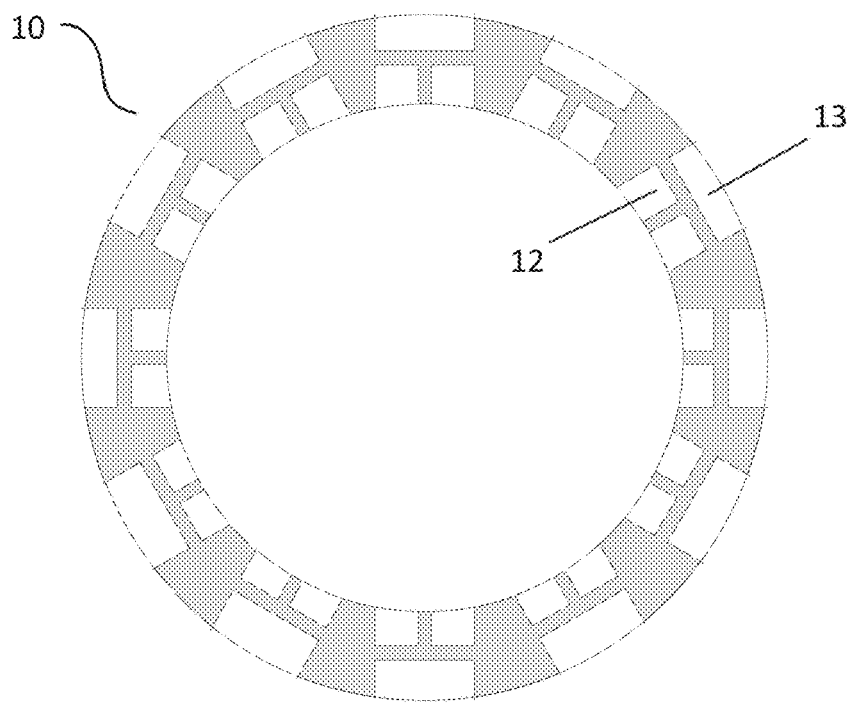
FIG. 19 a schematic illustration of another rotor ring.
Figure 20:
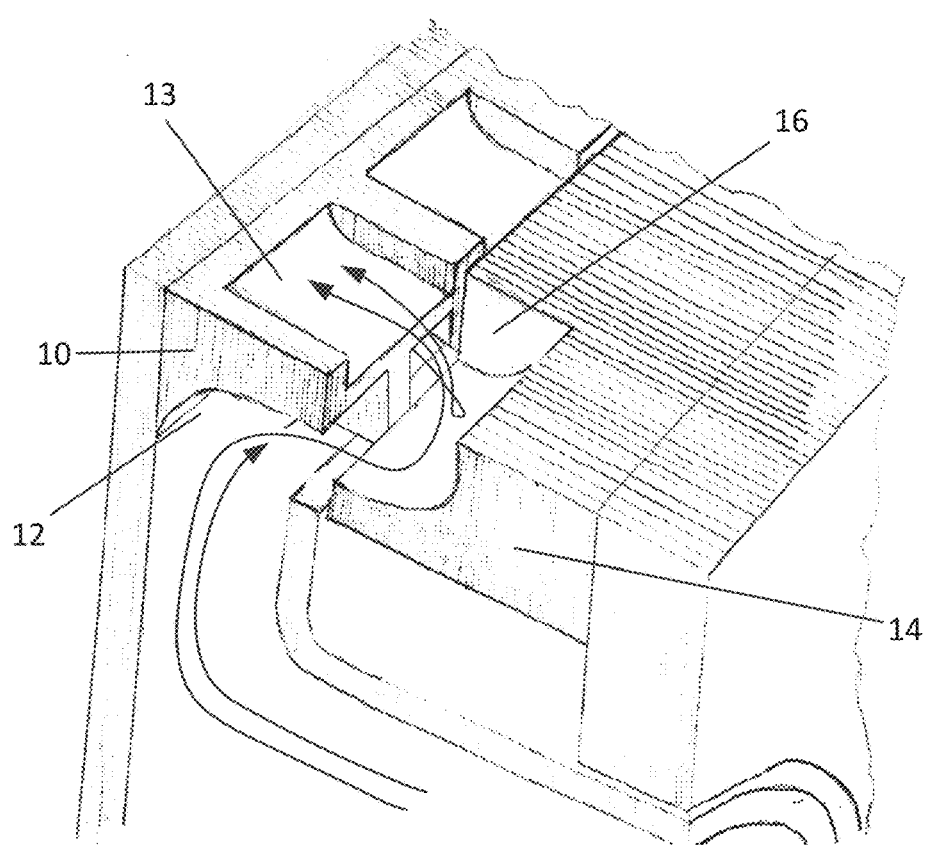
FIG. 20 a perspective drawing of flows with the rotor ring of FIG. 19.

FIG. 18 illustrates another configuration of a nozzle 27, with an angled outlet plane. FIG. 18 also indicates two speeds at different positions in the housing outside the rotor/stator rings: $v_1$ outside the rotor ring but prior to the nozzle, and $v_2$ between the nozzle outlet and the rotor ring. As the nozzle obstructs flow outside the rotor ring and only permits flow to pass in the gap between the nozzle and the rotor ring, in those different positions the flow speed is different, due to the different flow cross section areas. In an example it is calculated that $v_1=10$ m/sec and $v_2=133$ m/sec. The different flow speeds give rise to the Venturi effect, and the zone in the gap between the nozzle outlet and the rotor ring is at a relatively lower pressure, causing entrainment of the gas from the nozzle into the flow.

The outer surface of the rotor ring moves at a greater speed than $v_1$. As the rotor ring rotates, vortexes are generated and destroyed within the stator ring notches and outer rotor notches with high intensity. This too can cause a low-pressure zone near the nozzle, similar to a vortex pump with the rotor ring acting as a vortex impeller; the rotation of the rotor also assists in drawing gas from the nozzle into the flow. In an example water from the depth of 5 to 8 meters could be lifted through the nozzle thanks to a vacuum of about 200-500 mm Hg or about 50-80 kPa at the nozzle outlet, which is generated by the synergy between the Venturi effect and the operation of the rotor ring notches.

In general gas is provided (or, equivalently "injected") at a pressure below the average pressure of the liquid flow at the nozzle outlet, to prevent disruption of the flow produced by the generator and to prevent formation of gas bubbles in the liquid stream.

The nozzle delivers gas (or other fluid) to the flow and permit gas (or other fluid) to be drawn into and interact with the flow.

A wide variety of materials are suitable for the rotor and stator ring. In an example a rotor and stator ring are formed of a steel, for example a stainless steel that comprises from 17% to 19% by weight chromium, from 9% to 11% by weight nickel, 0.8% by weight titanium, 1.5% by weight manganese and 0.03% by weight copper. An example of a stainless steel comprises following composition:

Fe,
<0.07% C,
16-19% Cr,
9-14% Ni,
2-3% Mo,
0.1-2% Mn,
0.1-1% Ti,
<0.05% Cu,
<1% Si,
<0.05% P,
<0.03% S.

Figure 21A:
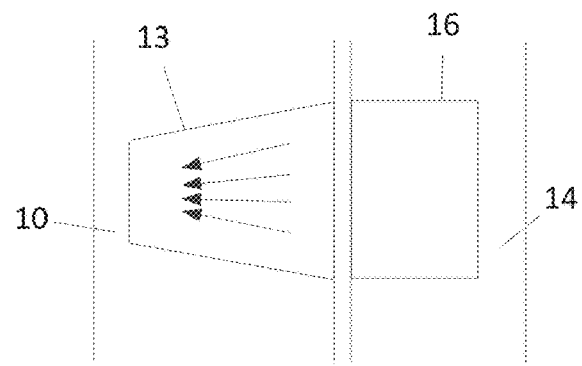
FIG. 21a a schematic view of another rotor ring.
Figure 21B:
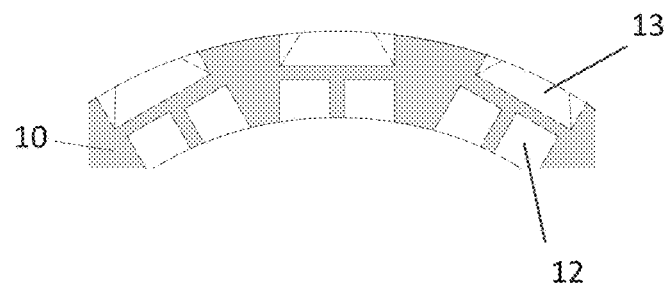

While the examples provided above are concerned with a rotor rotating with 3000 revolutions per minute (RPM) ±20%, and having an outer diameter of the rotor and the rotor disc and stator disc of about 30 cm±20%, it should be appreciated that a toroid vortex dispersion can similarly be created at lower or higher RPM provided the rotor's diameter is suitably increased or decreased. For instance, in a generator with an outer diameter of the rotor and the rotor disc and stator disc of about 45 cm, a suitable rotor rotation speed is around 2000 revolutions per minute. In a generator with an outer diameter of the rotor and the rotor disc and stator disc of about 90 cm, a suitable rotor rotation speed is around 1000 revolutions per minute. In all of these examples, the peripheral speed (tangential speed) of the rotating rotor, at the rotor disc (e.g. at an inlet to the rotor disc, or at an outer edge of the rotor disc), is around 47 m/sec. For a generator to produce a toroid vortex dispersion effectively, the peripheral speed of the rotor, at the rotor disc, is preferably 30 m/sec or more. A peripheral speed in the range from 20-29 m/sec is borderline and may be unstable or ineffective, though it may permit formation of a toroid vortex dispersion. A peripheral speed in the range from 15-19 m/sec may in some configurations (e.g. in otherwise particularly effective configurations) permit formation of a toroid vortex dispersion.

In some of the examples provided above the inner notches 12 and the outer notches 13 of the rotor ring 8 are aligned with one another, e.g. as seen in FIGS. 5 and 10; in others they are not aligned, e.g. as seen in FIG. 2, or some are aligned and others are not. In some of the examples provided above the inner notches and the outer notches of the rotor ring have the same or similar widths; in other examples the inner notches and the outer notches of the rotor ring do not have the same widths, e.g. as seen in FIG. 10 where the inner notches are narrow than the outer notches.

FIG. 19 shows another arrangement of notches that is observed to be particularly effective at creating a flow of toroid vortexes. FIG. 20 illustrates the rotor ring of FIG. 19 with a stator ring 14 in a generator. In this rotor ring 10, one outer notch 13 spans two inner notches 12. In the stator ring 14 the stator notches 16 are such that a stator notch 16 spans two inner notches 12. A stator notch 16 may be same or similar width as an outer rotor notch 13.

FIG. 20 illustrates some flow paths in the generator with the rotor ring 10 of FIG. 19. Flow from a pair of inner notches 12 of the rotor ring 10 is directed to a common rotor notch 16 of rotor ring 14. Each inner notch 12 is formed to channel liquid at an angle to its neighboring notch, such that a pair of inner notches 12 that face the same outer notch 13 channel fluid toward a common area. The central flow axes of a pair of inner notches are at a converging angle to one another; the angle is such that a point of intersection of the two flow axis is inside the volume of the notch of the stator ring, as illustrated in FIG. 20.

Movement of the rotor ring 10 is now considered, starting from when two inner rotor notches 12 of the rotor ring 10 are fully aligned with a stator notch 16 of the stator ring 16, as seen in FIG. 20. As the rotor ring moves, one of the pair of inner notches remains fully open, while the other of the pair of inner notches becomes partially closed. In this instant, the flow speed via the partially obstructed inner notch is significantly higher than the flow speed via the fully open inner notch. The two flows interact in the stator notch. The presence of an angle between these flows causes the faster flow to accelerate the slower flow.

With the notch design of FIGS. 19 and 20, the points of maximum speeds are shifted compared against the velocity plot shown in FIG. 13*a*. What is more, the maximum flow velocity is significantly increased due to the cumulative effect of contact between two vortex braids with subsequent significant positive and negative acceleration. The number of toroid vortexes generated in the system increases exponentially, and their total peripheral speed significantly increases compared to those described above with reference to FIGS. 13*a*, 13*b* and 13*c*.

The examples illustrated in FIGS. 19 and 20 provide stator notches spanning two inner notches so as to commingle the periodic flows from two inner notches in a stator notch. It should be appreciated that a stator notch need not span exactly two inner notches; it may for example be sized to span more, or less, than two inner notches. In an alternative one stator notch spans one inner notch as illustrated in e.g. FIGS. 2 and 3, but the outer notches 16 are sized so as to span two stator notches. In this way the periodic flow from two stator notches is conmingled in an outer notch. Flow interactions are promoted, and the number of toroid vortices generated is increased.

FIGS. 21*a* and 21*b* show plan and front view schematics of outer rotor notches 13 with a bottleneck design. In the examples previously illustrated, the outer notches of the rotor ring have parallel side walls, as seen e.g. in FIG. 7. As shown in FIGS. 21a and 21b the exit section of the outer notches 13 of the rotor ring 10 may be formed to provide channels that are progressively narrower and with smaller flow area and that resemble a bottleneck. The liquid is compressed as it moves along these channels. Flow speeds are increased as are flow interactions, and the number of toroid vortices generated is increased.

Figure 22:
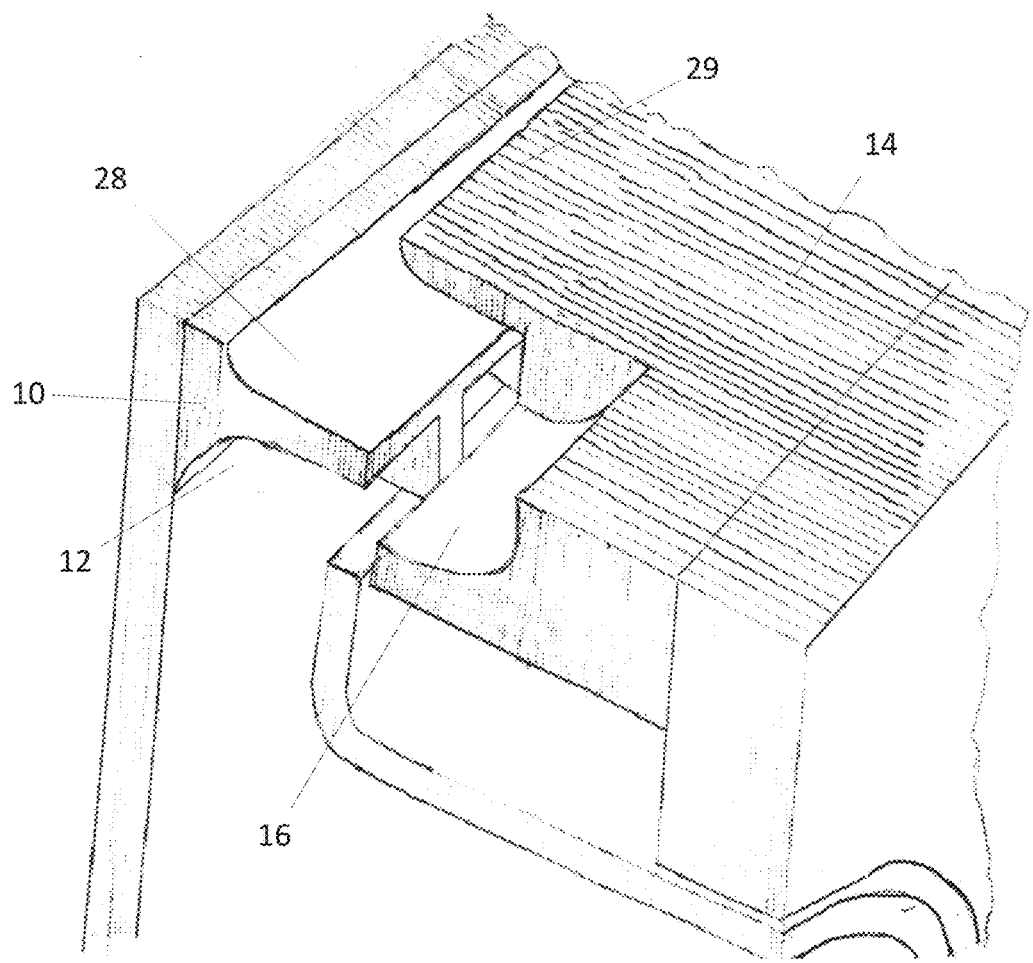
FIG. 22 a perspective drawing of another rotor ring and stator ring.

FIG. 22 shows a variant where the rotor ring 10 does not provide outer notches. Instead, the outside part of the rotor ring constitutes an outer surface 28 shaped like a carved-out toroid with a certain curvature; the cross section of the outer surface 28 is same as or similar to the cross section of an outer notch, such that the outer surface 28 can provide a redirection of the flow similar to the outer notches as described above. The stator 14 includes prongs 29 between the stator notches 16 that project toward the outer surface 28 of the rotor ring 10. In this variant the gap 17 between the opposing side surfaces of the rotor disc and stator disc extends further between the prongs 29 and the outer surface 28 of the rotor, to permit movement of liquid along the outer surface 28 of the stator ring 10 and provide a passage via the gap 17 for a permanent liquid flow. The prongs 29 also form a notch-like channel for fluid to pass between the prongs 29 after exiting the stator notches, similar to the outer rotor notches in the other variants.

The features described with reference to FIGS. 19 to 22 can be combined for particularly effective formation of toroid vortexes in the flow.

While the examples provided above are concerned with a centrifugal pump moving fluid in radial direction toward the rotor/stator discs, it should be appreciated that a toroid vortex dispersion can similarly be created in a pump that pumps fluid in an axial direction toward suitably adapted rotor/stator discs.

Figure 23:
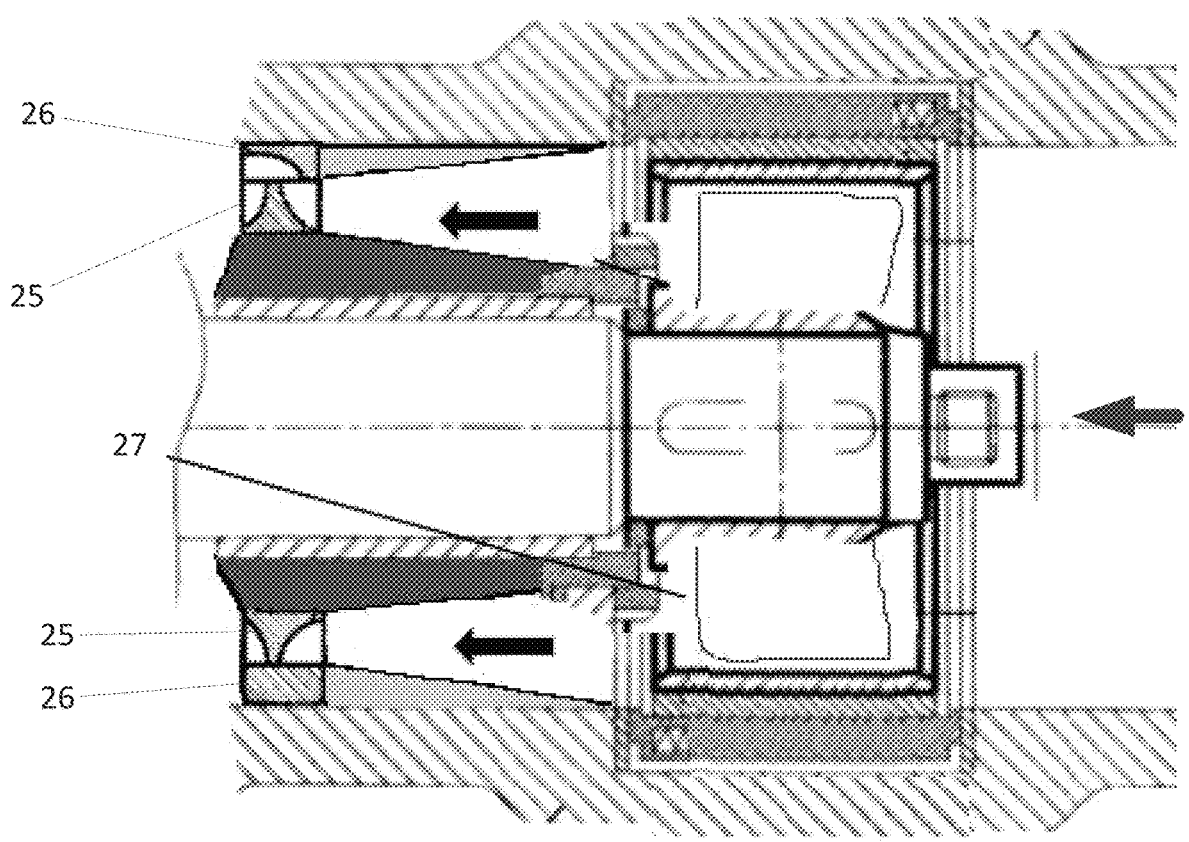
FIG. 23 a schematic illustration of an alternative generator with axial flow.

FIG. 23 provides a schematic illustration of an alternative generator with a rotor disc and a stator disc adapted for axial flow, rather than radial flow, with an axial flow impeller 27 instead of a radial flow impeller as described above.

In this configuration, the stator ring 26 is arranged concentrically outside the rotor ring 25 with a gap between the inner cylindrical surface of the stator ring 26 and the outer cylindrical surface of the rotor ring 25. The rotor ring 25 has inner rotor notches on a flow-facing side such that flow from the impeller can enter the inner rotor notches. The stator ring 26 has stator notches arranged on its inner cylindrical surface, facing the rotor ring. The flow is redirected by the inner rotor notches toward the stator ring, either entering the gap between the rings (in the configuration illustrated in the lower half of the cross section in FIG. 23) or entering a stator notch (in the configuration illustrated in the upper half of the cross section in FIG. 23). The stator notches redirect the fluid further.

For efficient formation of toroidal vortices, the flow entering the inner rotor notches has a tangential velocity (tangential to the rotational motion of the rotor) of e.g. at least 15-25 m/sec. Suitable guide vanes can be provided upstream of the rotor ring, to ensure that the flow entering the inner rotor notches has a suitable tangential velocity, while ensuring that the generator creates a pressure of at least 5 to 7 atmospheres (506-709 kPa). In the absence of a tangential velocity component the rotor ring causes such a tangential velocity component to be produced in the flow, which can result in a relevant loss of energy and less efficient formation of toroidal vortices.

LIST OF REFERENCE NUMERALS 1 generator
2 liquid
3 stator housing
4 inlet opening
5 outlet opening
6 plane
7 axis
8 rotor
9 channels
10 rotor disc
11 side surface of the rotor disc
12 inner notches
13 outer notches
14 stator disc
15 side surface on the stator disc
16 stator notches
17 gap
18 permanent liquid flow
19 periodical liquid flow
20 total liquid flow
21 guide vane
22 vortex braid flow
23 guide vane passage
24 spiral discharge duct
25 rotor ring (axial flow variant)
26 stator ring (axial flow variant)
27 nozzle
28 outer surface
29 prong

The invention claimed is:

1. A generator for generating toroidal and spatial vortices in a liquid, comprising a stator with a stator disc and a rotor with a rotor disc, the rotor being adapted to drive liquid from an inlet toward the rotor disc, and the stator disc arranged facing the rotor disc and spaced apart from the rotor disc by a gap, the rotor disc comprising inner notches arranged to redirect fluid toward the stator disc, the stator disc comprising stator notches wherein the stator notches comprise curved surfaces that operably redirect the flow of fluid by approximately 60 to 120 degrees;

such that when an inner notch and a stator notch face each other a passage is provided via the inner notch and the stator notch for a periodical liquid flow for generating toroidal vortices due to the redirections of the fluid, and such that when an inner notch and a stator notch do not face each other a passage is provided via the inner notch and the gap for a permanent liquid flow for generating spatial vortices due to the velocity difference of the rotor disc and the stator disc defining the gap.

2. The generator according to claim 1, characterized in that the rotor disc comprises outer notches arranged to receive fluid from stator notches and formed to redirect fluid further, for further increasing the building of toroid vortices within the periodical liquid flow before it may exit the rotor disc.

3. The generator according to claim 1, characterised in that the rotor disc comprises an outer surface arranged to receive fluid from stator notches and formed to redirect fluid further; and preferably further characterized in that the stator disc comprises prongs arranged between the stator notches and protruding toward the outer surface, for forming notch-like spaces between the prongs for receiving fluid from the stator notches.

4. The generator according to claim 1, whereas the number of the inner notches equals the number of the stator notches.

5. The generator according to claim 1, whereas a stator notch is sized to span two inner notches and two neighboring inner notches are formed to converge flows toward one another to intersect in a stator notch.

6. The generator according to claim 1, whereas the respective number of inner notches and stator notches is between 16 and 42, and/or the rotor disc has an inner diameter of at least 14 cm.

7. The generator according to claim 1, whereas the rotor is adapted to drive liquid from an inlet toward the rotor disc at pressure of from 400 kPa to 1.2 MPa.

8. The generator according to claim 1, whereas the flow downstream of the stator disc comprises, in the same flow, a first local pressure of at least 10 MPa and second local pressure of up to 1 mPa.

9. The generator according to claim 1, whereas the flow downstream of the stator disc comprises, in the same flow, a first local flow velocity of at least 100 meters per second and a second local flow velocity of up to 4 meters per second.

10. The generator according to claim 1, whereas downstream of the stator disc the peripheral flow velocity in a toroidal vortex is greater than the flow velocity in the fluid outside the toroidal vortex by a factor of at least 10.

11. The generator according to claim 1, whereas the flow downstream of the stator disc comprises toroidal vortices having a typical diameter of at least 10 μm.

12. The generator according to claim 1, whereas the flow downstream of the stator disc includes from 150 to 5000 toroidal vortices per litr of fluid.

13. The generator according to claim 1, further comprising a nozzle for providing a further liquid to the flow, wherein the nozzle is arranged downstream of the stator disc.

14. A method of operation of the generator according to claim 1 for generating toroidal and spatial vortices in a liquid, by the steps of:
  a) bringing the liquid to the inlet opening;
  b) bringing the rotor with the rotor disc attached into rotation;
  c) producing a permanent liquid flow and a periodical liquid flow between the stator disc and the rotor disc;
  d) generating toroidal vortices in the portioned liquid of the periodical liquid flow by shear stress as the portions of liquid pass from the inner notches to the stator notches;
  e) generating spatial vortices in the permanent liquid flow in the gap between the side surfaces due to the velocity difference of the side surfaces and due to periodical disruptions by the portioned liquid passing the gap in axial direction;
  f) combining the permanent liquid flow and the periodical liquid flow to a total liquid flow; and
  g) conducting the total liquid flow to the outlet opening of the generator to let it exit the generator.

15. The method according to claim 14, wherein the rotor rotates with 3000 revolutions per minute, ±20%.

16. The method according to claim 14, wherein the rotor rotates such that a peripheral speed of the rotor at the rotor disc is at least 15 m/sec.

17. The method according to claim 14, whereas the capacity of the generator is approximately 200 m$^3$/hour, ±20%.

18. The method according to claim 14, whereas the liquid brought to the inlet opening is water with dissolved inorganic salts, and the total liquid flow conducted away from the outlet opening is fresh water with admixed water-soluble crystallised inorganic salts.

19. The method according to claim 14, whereas the liquid brought to the inlet opening is fuel oil with 3-5% sulphur and up to 3% water, and whereas the total liquid flow conducted away from the outlet opening is fuel oil with 0.3-0.5% sulphur, up to 5% colloidal sulphur and up to 1% liquid hydrocarbon.

20. A use of the method according to claim 14, in one of the following industries:
  a) in petroleum, refining, petrochemical, pharmaceutical, chemical, food processing, and construction industries;
  b) in the water treatment in power generation and in the food processing;
  c) in the energy sector in the water steam production;
  d) in industries for production of fresh potable and non-potable water;
  e) for production of monomolecular layers as graphene in dispersing solids whereby the solids are split along flat parallel layers;
  f) in the nuclear power sector to treat contaminated effluents while producing concentrated isotopes of radioactive materials and fresh non-potable water;
  g) in the wastewater treatment sector to treat industrial and household effluents in order to remove dissolved inorganic salts and to obtain purified water plus dry inorganic salts; and
  h) in the treatment of sea and ocean water to remove water-soluble minerals, and the concentration of such removed water-soluble inorganic salt.

* * * * *